United States Patent
Rutherford

(10) Patent No.: US 8,031,428 B1
(45) Date of Patent: *Oct. 4, 2011

(54) SINGLE-PASS SPIRAL SELF-SERVO-WRITE

(75) Inventor: David Rutherford, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/853,328

(22) Filed: Aug. 10, 2010

Related U.S. Application Data

(63) Continuation of application No. 11/999,416, filed on Dec. 5, 2007, now Pat. No. 7,773,334.

(60) Provisional application No. 60/868,797, filed on Dec. 6, 2006.

(51) Int. Cl.
*G11B 21/02* (2006.01)

(52) U.S. Cl. ........................................ 360/75

(58) Field of Classification Search ............... 360/78.14, 360/75, 51, 77.08, 39, 31
See application file for complete search history.

(56) References Cited

U.S. PATENT DOCUMENTS

| | | | |
|---|---|---|---|
| 4,107,746 A * | 8/1978 | Conway | 360/78.14 |
| 4,635,138 A | 1/1987 | Louth | |
| 4,672,474 A | 6/1987 | Rodal | |
| 5,448,429 A | 9/1995 | Cribbs et al. | |
| 5,541,784 A | 7/1996 | Cribbs et al. | |
| 5,559,648 A | 9/1996 | Hunter et al. | |
| 5,612,833 A | 3/1997 | Yarmchuk et al. | |
| 5,668,679 A | 9/1997 | Swearingen et al. | |
| 5,774,298 A | 6/1998 | Cheung et al. | |
| 5,907,447 A | 5/1999 | Yarmchuk et al. | |
| 6,023,389 A | 2/2000 | Cunningham | |
| 6,040,955 A | 3/2000 | Brown et al. | |
| 6,260,257 B1 | 7/2001 | Emo et al. | |
| 6,304,407 B1 | 10/2001 | Baker et al. | |
| 6,324,030 B1 | 11/2001 | Cheung et al. | |
| 6,504,882 B1 | 1/2003 | Kim | |
| 6,507,450 B1 | 1/2003 | Elliott | |
| 6,603,722 B1 | 8/2003 | Taguchi et al. | |
| 6,704,156 B1 | 3/2004 | Baker et al. | |
| 6,738,205 B1 | 5/2004 | Moran et al. | |
| 6,775,091 B1 | 8/2004 | Sutardja | |
| 6,775,338 B1 | 8/2004 | Sutardja | |
| 6,924,960 B1 | 8/2005 | Melkote et al. | |
| 6,937,420 B1 | 8/2005 | McNab et al. | |

(Continued)

OTHER PUBLICATIONS

Edward A. Lee et al.; "Digital Communications"; Second Edition, Kluwer Academic Publishers; Jan. 1994; pp. 409-424.

(Continued)

*Primary Examiner* — Fred Tzeng

(57) ABSTRACT

A self-servo-write system including a timing control module and a position control module. The timing control module is configured to generate (i) timing information of a first set of servo spirals and (ii) timing control signals for writing a second set of final servo wedges based on the timing information. The position control module is configured to generate (i) position information of the first set of servo spirals and (ii) positioning control signals for writing the second set of final servo wedges based on the timing information. Less than half of the servo spirals in the first set of servo spirals are overwritten while writing the second set of final servo wedges. A ratio of a first number of final servo wedges in the second set of final servo wedges to a second number of servo spirals in the first set of servo spirals is a non-integer greater than one.

20 Claims, 27 Drawing Sheets

U.S. PATENT DOCUMENTS

| | | | |
|---|---|---|---|
| 6,977,794 B1 | 12/2005 | Sun et al. | |
| 7,002,761 B1 * | 2/2006 | Sutardja et al. | 360/29 |
| 7,046,475 B2 | 5/2006 | Hosokawa | |
| 7,088,533 B1 * | 8/2006 | Shepherd et al. | 360/51 |
| 7,193,797 B1 | 3/2007 | Sun et al. | |
| 7,209,312 B1 | 4/2007 | Sutardja | |
| 7,230,789 B1 | 6/2007 | Brunnett et al. | |
| 7,251,095 B1 | 7/2007 | Rigney et al. | |
| 7,307,806 B1 * | 12/2007 | Sutardja et al. | 360/29 |
| 7,307,807 B1 * | 12/2007 | Han et al. | 360/75 |
| 7,375,918 B1 * | 5/2008 | Shepherd et al. | 360/78.14 |
| 7,414,809 B2 * | 8/2008 | Smith et al. | 360/77.08 |
| 7,463,437 B1 * | 12/2008 | Sutardja et al. | 360/29 |
| 7,551,389 B2 * | 6/2009 | Tsuda et al. | 360/75 |
| 7,580,216 B1 * | 8/2009 | Han et al. | 360/75 |
| 7,623,313 B1 | 11/2009 | Liikanen et al. | |
| 7,646,559 B1 * | 1/2010 | Cheung et al. | 360/75 |
| 7,715,134 B1 * | 5/2010 | Sutardja et al. | 360/29 |
| 7,760,459 B1 * | 7/2010 | Han et al. | 360/75 |
| 7,791,832 B1 * | 9/2010 | Cheung et al. | 360/75 |
| 7,864,895 B1 * | 1/2011 | Han et al. | 375/341 |
| 2001/0033451 A1 | 10/2001 | Miles | |
| 2005/0078566 A1 | 4/2005 | Wilson et al. | |
| 2005/0280916 A1 | 12/2005 | Calfee et al. | |
| 2008/0030888 A1 * | 2/2008 | Brunnett et al. | 360/75 |

OTHER PUBLICATIONS

U.S. Appl. No. 10/799,474, filed Mar. 11, 2004; "Disk Servo Pattern Writing"; Ke Han et al.; 59 pages.

* cited by examiner

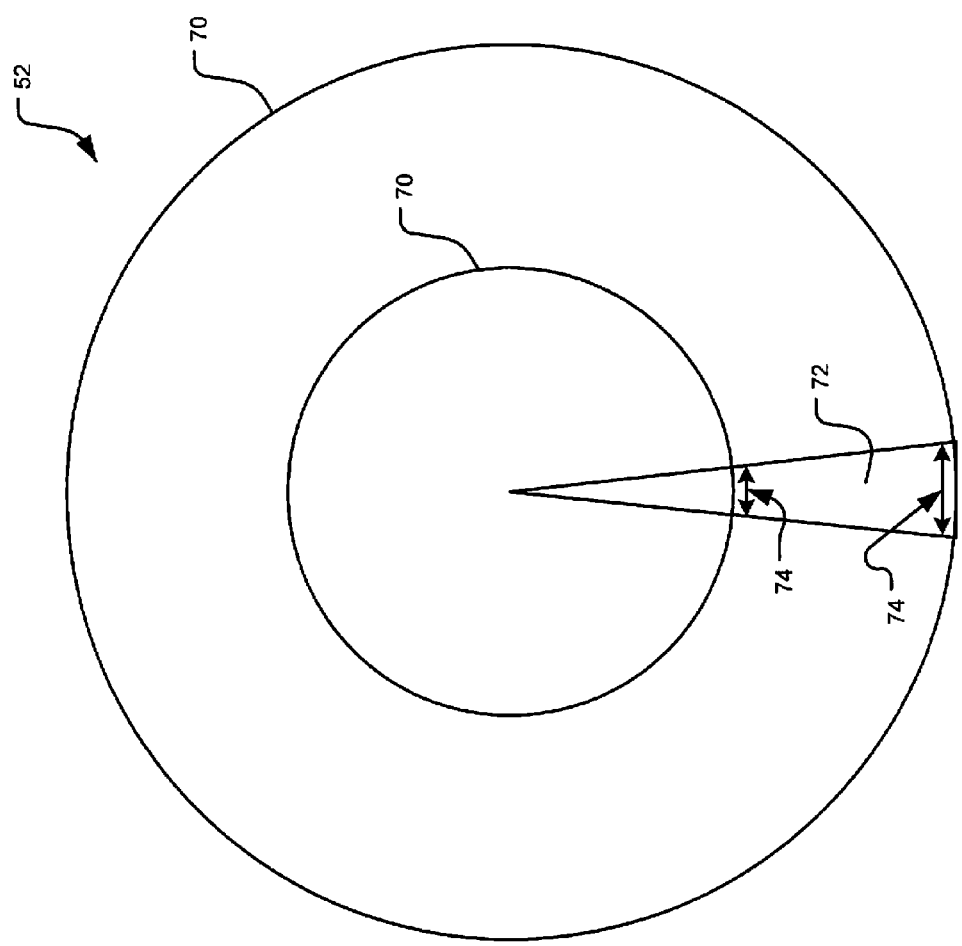

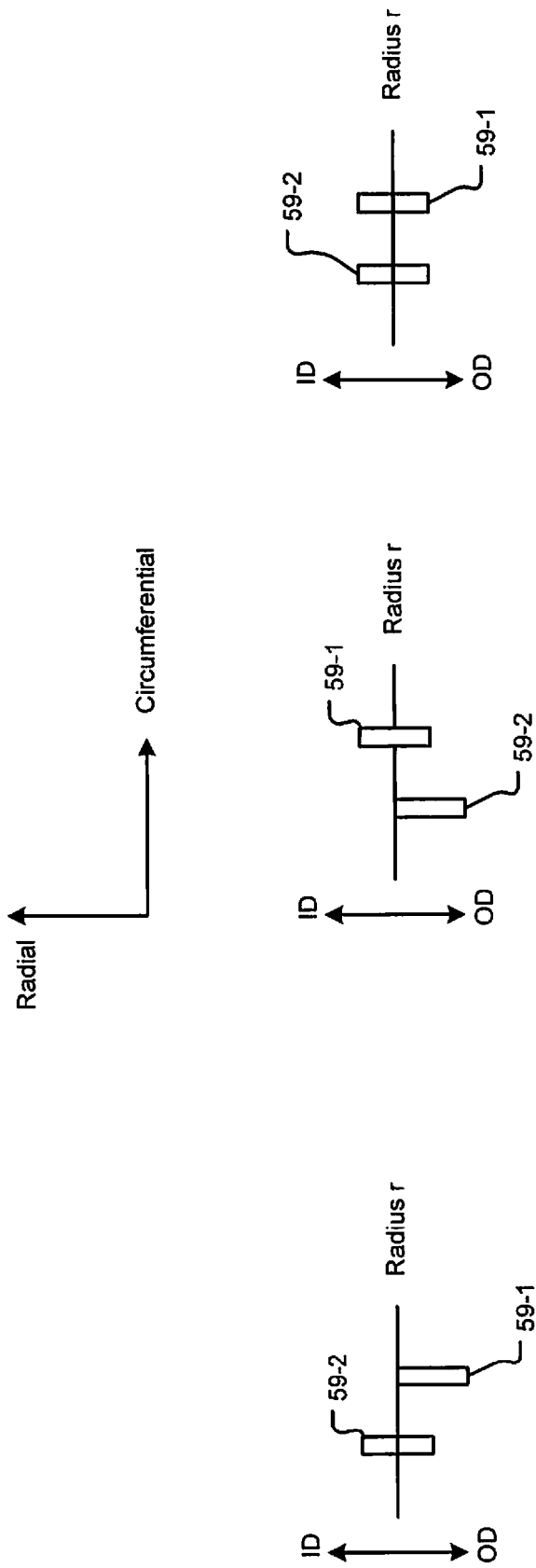

SINGLE-PASS SPIRAL SELF-SERVO-WRITE

CROSS-REFERENCE TO RELATED APPLICATIONS

This application is a continuation of U.S. patent application Ser. No. 11/999,416, filed Dec. 5, 2007, which claims the benefit of U.S. Provisional Application No. 60/868,797 filed Dec. 6, 2006. The disclosures of the above applications are incorporated herein by reference in their entirety.

This application is related to U.S. Pat. No. 7,209,312.

FIELD

The present disclosure relates to hard disk drives (HDDs), and more particularly to writing servo information on HDDs.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a hard disk drive (HDD) 10 includes a hard disk assembly (HDA) 50 and a HDA printed circuit board (PCB) 14. The HDA PCB 14 comprises a buffer module 18 that stores data associated with the control of the HDD 10. The buffer module 18 may employ SDRAM or other types of low latency memory. A processor 22 is arranged on the HDA PCB 14 and performs processing that is related to the operation of the HDD 10.

A hard disk controller (HDC) module 26 communicates with the buffer module 18, the processor 22, a spindle/VCM (voice coil motor) driver module 30, and an input/output interface module 24. The input/output interface module 24 may include a serial interface module, a parallel interface module, a serial Advance Technology Attachment (ATA) interface module, or a parallel ATA interface module.

Additionally, the HDC module 26 communicates with a read/write (R/W) channel module 34. During write operations, the R/W channel module 34 encodes data that is to be written by a R/W device 59. The R/W device 59 may also be referred to as the R/W head 59. The R/W channel module 34 processes data for reliability using coding schemes such as error correction coding (ECC) and run length limited coding (RLL). During read operations, the R/W channel module 34 converts an analog output of the R/W head 59 into a digital signal. The digital signal is then decoded to recover the data written on the HDD 10.

The HDA 50 includes one or more circular recording surfaces called platters 52 that are used to store data. The platters 52 include a magnetic coating for storing data in terms of magnetic fields. The platters 52 are stacked on top of one another in the form of a spindle. The spindle comprising the platters 52 is rotated by a spindle motor 54. Generally, the spindle motor 54 rotates the platters 52 at a fixed speed during read/write operations. The spindle/VCM driver module 30 controls the speed of the spindle motor 54.

One or more actuator arms 58 move relative to the platters 52 during read/write operations. The spindle/VCM driver module 30 also controls the positioning of the actuator arm 58 by using mechanisms such as a voice coil actuator or a stepper motor. For example, a voice coil motor (VCM) 57, which is controlled by the spindle/VCM driver module 30, may be used to control the positioning of the actuator arm 58.

The R/W head 59 is located near a distal end of the actuator arm 58. The R/W head 59 includes a write element such as an inductor (not shown) that generates a magnetic field. The R/W head 59 also includes a read element (such as a magneto-resistive (MR) element, also not shown) that senses magnetic field on the platters 52. The HDA 50 includes a preamp module 60, which amplifies analog read/write signals.

When reading data, the preamp module 60 amplifies low-level signals received from the read element and outputs the amplified signal to the R/W channel module 34. While writing data, a write current is generated that flows through the write element of the R/W head 59. The write current is switched to produce a magnetic field having a positive or negative polarity. The positive or negative polarity is stored on the hard drive platters 52 and is used to represent data.

Referring now to FIG. 2, data is typically written on the platters 52 in concentric circles called tracks 70. The tracks 70 are divided radially into multiple sectors 72. A circumferential length 74 of sectors 72 decreases as the diameter of the tracks 70 decreases towards the center of the platters 52.

Before performing a read/write operation on a sector 72 of a track 70, the R/W head 59 locks onto the track 70 by referring to positioning information called servo information. Servo information is generally prewritten on the platters 52 and provides the positioning information that is used by the R/W head 59 to read and write data at correct locations on the platters 52.

Modern HDDs increasingly use self-servo-write (SSW) methods instead of using external equipment to write servo information. Disk drives that utilize SSW methods write servo information using the same R/W heads that are used to read/write regular data. When writing servo information using SSW methods, the R/W heads initially write a preliminary servo pattern comprising servo wedges written in spirals. Subsequently, by servoing on the spirals and based on the timing and positioning information derived from the spirals, the R/W heads write a final servo pattern comprising servo wedges written in circles.

Referring now to FIGS. 3A-3B, a HDD 11 may use a SSW module 28 to write servo information. In FIG. 3A, the SSW module 28 may communicate with the processor 22, the HDC module 26, the spindle/VCM driver module 30, and the R/W channel module 34. The SSW module 28 may generate control signals to write servo information on platters 52. For example, the SSW module 28 may generate control commands that control movement of the actuator arm 58 during servo writing. The HDC module 26 and the spindle/VCM driver module 30 may implement the control commands during SSW. The SSW module 28 may generate a servo pattern that is written on the platters 52 using the read/write device 59. Additionally, the SSW module 28 may utilize the processor 22 to verify the servo pattern by performing read-after-write operations.

During SSW, the platters 52 may rotate in direction A, and the actuator arm 58 may move in direction B as shown in FIG. 3B. Motion delimiters called crashstops may be used to prevent the actuator arm 58 from moving beyond safe limits. For example, the VCM 57 may cause the actuator arm 58 to move between crashstop 55 and crashstop 53 while the R/W head 59 writes servo spirals 80 between tracks 70. The crashstop 55 may be referred to as an outer diameter (OD) crashstop 55. The crashstop 53 may be referred to as an inner diameter (ID) crashstop 53. Spirals 80 may be written from ID to OD or from OD to ID. When spirals 80 are written, the actuator arm

58 is accelerated from a stationary position to a predetermined velocity by applying current to the VCM 57.

Referring now to FIG. 4, spirals comprise servo wedges (hereinafter spiral wedges). For example, spiral 0 comprises spiral wedges s0, spiral 1 comprises spiral wedges s1, etc. Since spiral wedges are written diagonally (i.e., in spirals), the position of spirals has variable radial and circumferential components.

The final servo wedges (hereinafter final wedges) f0, f1, etc. may be written after or while writing the spirals by servoing on the spirals. Since the final wedges are written radially, (i.e., in circles instead of spirals), the radial component of the position of final wedges may vary but the circumferential component of the position of the final wedges may be fixed.

When the final wedges are written, the final wedge f0 may overwrite spiral s0, final wedge f1 may overwrite spiral s1, and so on. Additionally, as the radius increases, the final wedge f1 may overwrite spiral s0, the final wedge f2 may overwrite spiral s1, and so on.

SUMMARY

A self-servo-write (SSW) system of a hard disk drive (HDD) comprises a timing control module and a position control module. The timing control module generates timing information of S servo spirals and generates timing control signals for writing F final servo wedges in a circle based on the timing information, where F and S are integers, and where F is greater than S. The position control module generates position information of the S servo spirals and generates positioning control signals for writing the F final servo wedges in the circle based on the timing information.

In another feature, a ratio of F to S is a non-integer.

In another feature, the timing control module comprises a demodulation module, a phase-locked loop (PLL) module, and a synthesizer module. The demodulation module demodulates servo wedges of the S servo spirals and generates the timing information. The phase-locked loop (PLL) module is synchronized to the timing information and generates PLL control signals. The synthesizer module synthesizes read and write control signals that control reading of the S servo spirals and writing of the F final servo wedges based on the PLL control signals, respectively.

In another feature, the SSW system further comprises a read window module and a write window module. The read window module generates read windows to read the S servo spirals based on the read control signals. The write window module generates write windows for writing the F final servo wedges based on the write control signals, wherein the write control signals are synchronized to circumferential positions of the S servo spirals.

In another feature, the SSW system further comprises an error processing module that measures repeatable runout (RRO) and non-repeatable runout (NRRO) errors in the timing information and that generates feed-forward and feedback information based on the RRO and NRRO errors, respectively, wherein the synthesizer module generates the read and write control signals based on at least one of the feed-forward and feedback information.

In another feature, the PLL module comprises a read ramp generator module, a write ramp generator module, and a period translator module. The read ramp generator module generates read ramps based on a number of the S servo spirals read per revolution of the HDD. The write ramp generator module generates write ramps based on a number of the F final servo wedges written per revolution of the HDD. The period translator module translates periods of servo wedges of the S servo spirals into periods of the F final servo wedges.

In another feature, the PLL module further comprises a phase detector module and a compensation module. The phase detector module detects a difference in phases of the read and write ramps. The compensation module that compensates the difference, wherein the write control signals are synchronized to circumferential positions of the S servo spirals.

In another feature, the SSW system further comprises a collision detector module that detects when the read and write windows coincide, wherein the timing and position control modules disregard the timing and position information when the read and write windows coincide.

In another feature, the position control module further comprises a repeatable runout (RRO) measuring module, a position measuring module, an interpolation module, and a write positioning module. The repeatable runout (RRO) measuring module measures first and second RRO errors of the S servo spirals at first and second radii during a revolution of the HDD, respectively. The position measuring module measures first and second positions of the S servo spirals at the first and second radii during the revolution, generates third and fourth positions by subtracting the first and second RRO errors from corresponding ones of the first and second positions, respectively, and generates midpoints of the third and fourth positions. The interpolation module interpolates the first and second RRO errors, generates interpolated RRO errors, subtracts the interpolated RRO errors from the midpoints, and generates final positions for writing the F final servo wedges. The write positioning module generates the positioning control signals based on the final positions.

In another feature, the timing control module further comprises a repeatable runout (RRO) measuring module and an interpolation module. The repeatable runout (RRO) measuring module measures first and second RRO errors in the timing information of the S servo spirals at first and second radii during a revolution of the HDD, respectively. The interpolation module interpolates the first and second RRO errors, generates interpolated RRO errors, and generates the timing control signals by subtracting the interpolated RRO errors from the timing information.

In another feature, the timing control module generates the timing control signals that are independent of the RRO errors.

In another feature, the SSW system further comprises a collision detector module and an error processing module. The collision detector module detects when the read and write windows coincide and that generates a collision detect signal. The error processing module measures repeatable runout (RRO) and non-repeatable runout (NRRO) errors in the timing information. The error processing module generates feed-forward and feedback information based on the RRO and NRRO errors, respectively. The position control module selects one of the feedback and feed-forward information based on the collision detect signal and generates the positioning control signals based on the one of the feedback and feed-forward information.

In another feature, the SSW system further comprises a write accounting module that includes first and second processor cores, wherein the first processor core performs a write accounting when the F final servo wedges are written and the second processor core processes the timing and position information.

In another feature, the SSW system further comprises a write accounting module that performs a write accounting at a first priority and that processes the timing and position information at second priority, wherein the first priority is greater than the second priority when the F final servo wedges are written.

In another feature, the SSW system further comprises a read/write channel module and a driver module. The read/write channel module communicates with the timing control module, reads the S servo spirals, and writes the F final servo wedges based on the timing control signals. The driver module communicates with the position control module and positions a read/write head of the HDD based on the positioning control signals.

In still other features, a method comprises generating timing information of S servo spirals, where S is an integer greater than 1 and generating timing control signals for writing F final servo wedges in a circle based on the timing information, where F is an integer greater than S. The method further comprises generating position information of the S servo spirals based on the timing information and generating positioning control signals for writing the F final servo wedges in the circle based on the position information and the timing information.

In another feature, a ratio of F to S is a non-integer.

In another feature, the method further comprises generating demodulated signals by demodulating servo wedges of the S servo spirals and generating the timing information based on the demodulated signals. The method further comprises generating PLL control signals by synchronizing a phase-locked loop (PLL) to the timing information. The method further comprises synthesizing read and write control signals based on the PLL control signals and controlling reading of the S servo spirals and writing of the F final servo wedges based on the read and write control signals.

In another feature, the method further comprises generating read windows for reading the S servo spirals based on the read control signals and generating write windows for writing the F final servo wedges based on the write control signals. The method further comprises synchronizing the write control signals to circumferential positions of the S servo spirals.

In another feature, the method further comprises measuring repeatable runout (RRO) and non-repeatable runout (NRRO) errors in the timing information and generating feed-forward and feedback information based on the RRO and NRRO errors, respectively. The method further comprises generating the read and write control signals based on at least one of the feed-forward and feedback information.

In another feature, the method further comprises generating read ramps based on a number of the S servo spirals read per revolution of the HDD and generating write ramps based on a number of the F final servo wedges written per revolution of the HDD. The method further comprises translating periods of servo wedges of the S servo spirals into periods of the F final servo wedges.

In another feature, the method further comprises detecting a difference in phases of the read and write ramps, compensating the difference, and synchronizing the write control signals to circumferential positions of the S servo spirals.

In another feature, the method further comprises detecting when the read and write windows coincide and disregarding the timing and position information when the read and write windows coincide.

In another feature, the method further comprises measuring first and second RRO errors in the position information of the S servo spirals at first and second radii during a revolution of the HDD, respectively. The method further comprises measuring first and second positions of the S servo spirals at the first and second radii during the revolution, respectively. The method further comprises generating third and fourth positions by subtracting the first and second RRO errors from corresponding ones of the first and second positions, respectively, and generating midpoints of the third and fourth positions. The method further comprises generating interpolated RRO errors by interpolating the first and second RRO errors and generating final positions for writing the F final servo wedges by subtracting the interpolated RRO errors from the midpoints. The method further comprises generating the positioning control signals based on the final positions.

In another feature, the method further comprises measuring first and second RRO errors in the timing information of the S servo spirals at first and second radii during a revolution of the HDD, respectively. The method further comprises generating interpolated RRO errors by interpolating the first and second RRO errors and generating the timing control signals by subtracting the interpolated RRO errors from the timing information.

In another feature, the method further comprises generating the timing control signals that are independent of the RRO errors.

In another feature, the method further comprises measuring repeatable runout (RRO) and non-repeatable runout (NRRO) errors in the timing information and generating feed-forward and feedback information based on the RRO and NRRO errors, respectively. The method further comprises generating a collision detect signal by detecting when the read and write windows coincide and selecting one of the feedback and feed-forward information based on the collision detect signal. The method further comprises generating the positioning control signals based on the one of the feedback and feed-forward information.

In another feature, the method further comprises performing a write accounting at a first priority and processing the timing and position information at a second priority that is less than the first priority.

In another feature, the method further comprises positioning a read/write head of a hard disk drive (HDD) based on the positioning control signals and writing the F final servo wedges based on the timing control signals.

In still other features, a self-servo-write (SSW) system of a hard disk drive (HDD) comprises timing control means for generating timing information of S servo spirals and generating timing control signals for writing F final servo wedges in a circle based on the timing information, where F and S are integers, and where F is greater than S. The SSW system further comprises position control means for generating position information of the S servo spirals and generating positioning control signals for writing the F final servo wedges in the circle based on the timing information.

In another feature, a ratio of F to S is a non-integer.

In another feature, the timing control means comprises demodulation means for demodulating servo wedges of the S servo spirals and generating the timing information. The timing control means further comprises phase-locked loop (PLL) means for generating PLL control signals, wherein the PLL means is synchronized to the timing information. The timing control means further comprises synthesizer means for synthesizing read and write control signals that control reading of the S servo spirals and writing of the F final servo wedges based on the PLL control signals, respectively.

In another feature, the SSW system further comprises read window generating means for generating read windows to read the S servo spirals based on the read control signals. The SSW system further comprises write window generating means for generating write windows for writing the F final servo wedges based on the write control signals, wherein the write control signals are synchronized to circumferential positions of the S servo spirals.

In another feature, the SSW system further comprises error processing means for measuring repeatable runout (RRO) and non-repeatable runout (NRRO) errors in the timing information and generating feed-forward and feedback information based on the RRO and NRRO errors, respectively, wherein the synthesizer means generates the read and write control signals based on at least one of the feed-forward and feedback information.

In another feature, the PLL means comprises read ramp generating means for generating read ramps based on a number of the S servo spirals read per revolution of the HDD and write ramp generating means for generating write ramps based on a number of the F final servo wedges written per revolution of the HDD. The PLL means further comprises period translator means for translating periods of servo wedges of the S servo spirals into periods of the F final servo wedges.

In another feature, the PLL means further comprises phase detector means for detecting a difference in phases of the read and write ramps and compensation means for compensates the difference, wherein the write control signals are synchronized to circumferential positions of the S servo spirals.

In another feature, the SSW system further comprises collision detector means for detecting when the read and write windows coincide, wherein the timing and position control means disregard the timing and position information when the read and write windows coincide.

In another feature, the position control means further comprises repeatable runout (RRO) measuring means for measuring first and second RRO errors of the S servo spirals at first and second radii during a revolution of the HDD, respectively. The position control means further comprises position measuring means for measuring first and second positions of the S servo spirals at the first and second radii during the revolution, generating third and fourth positions by subtracting the first and second RRO errors from corresponding ones of the first and second positions, respectively, and generating midpoints of the third and fourth positions. The position control means further comprises interpolation means for interpolating the first and second RRO errors, generating interpolated RRO errors, subtracting the interpolated RRO errors from the midpoints, and generating final positions for writing the F final servo wedges. The position control means further comprises write positioning means for generating the positioning control signals based on the final positions.

In another feature, the timing control means further comprises repeatable runout (RRO) measuring means for measuring first and second RRO errors in the timing information of the S servo spirals at first and second radii during a revolution of the HDD, respectively. The timing control means further comprises interpolation means for interpolating the first and second RRO errors, generating interpolated RRO errors, and generating the timing control signals by subtracting the interpolated RRO errors from the timing information.

In another feature, the timing control means generates the timing control signals that are independent of the RRO errors.

In another feature, the SSW system further comprises collision detector for detecting when the read and write windows coincide and that generates a collision detect signal. The SSW system further comprises error processing means for measuring repeatable runout (RRO) and non-repeatable runout (NRRO) errors in the timing information and generating feedforward and feedback information based on the RRO and NRRO errors, respectively. The position control means selects one of the feedback and feed-forward information based on the collision detect signal and generates the positioning control signals based on the one of the feedback and feed-forward information.

In another feature, the SSW system further comprises write accounting means for processing the timing and position information at a first priority and performing a write accounting at a second priority that is greater than the first priority when the F final servo wedges are written.

In another feature, the SSW system further comprises read/write channel means for reading the S servo spirals and writing the F final servo wedges based on the timing control signals and driver means for positioning a read/write head of the HDD based on the positioning control signals.

In other features, a computer program stored on a computer readable medium and executed by a processor comprises generating timing information of S servo spirals, where S is an integer greater than 1 and generating timing control signals for writing F final servo wedges in a circle based on the timing information, where F is an integer greater than S. The computer program further comprises generating position information of the S servo spirals based on the timing information and generating positioning control signals for writing the F final servo wedges in the circle based on the position information and the timing information.

In another feature, a ratio of F to S is a non-integer.

In another feature, the computer program further comprises generating demodulated signals by demodulating servo wedges of the S servo spirals and generating the timing information based on the demodulated signals. The computer program further comprises generating PLL control signals by synchronizing a phase-locked loop (PLL) to the timing information. The computer program further comprises synthesizing read and write control signals based on the PLL control signals and controlling reading of the S servo spirals and writing of the F final servo wedges based on the read and write control signals.

In another feature, the computer program further comprises generating read windows for reading the S servo spirals based on the read control signals and generating write windows for writing the F final servo wedges based on the write control signals. The computer program further comprises synchronizing the write control signals to circumferential positions of the S servo spirals.

In another feature, the computer program further comprises measuring repeatable runout (RRO) and non-repeatable runout (NRRO) errors in the timing information and generating feed-forward and feedback information based on the RRO and NRRO errors, respectively. The computer program further comprises generating the read and write control signals based on at least one of the feed-forward and feedback information.

In another feature, the computer program further comprises generating read ramps based on a number of the S servo spirals read per revolution of the HDD and generating write ramps based on a number of the F final servo wedges written per revolution of the HDD. The computer program further comprises translating periods of servo wedges of the S servo spirals into periods of the F final servo wedges.

In another feature, the computer program further comprises detecting a difference in phases of the read and write ramps, compensating the difference, and synchronizing the write control signals to circumferential positions of the S servo spirals.

In another feature, the computer program further comprises detecting when the read and write windows coincide and disregarding the timing and position information when the read and write windows coincide.

In another feature, the computer program further comprises measuring first and second RRO errors in the position information of the S servo spirals at first and second radii during a revolution of the HDD, respectively. The computer program further comprises measuring first and second positions of the S servo spirals at the first and second radii during the revolution, respectively. The computer program further comprises generating third and fourth positions by subtracting the first and second RRO errors from corresponding ones of the first and second positions, respectively, and generating midpoints of the third and fourth positions. The computer program further comprises generating interpolated RRO errors by interpolating the first and second RRO errors and generating final positions for writing the F final servo wedges by subtracting the interpolated RRO errors from the midpoints. The computer program further comprises generating the positioning control signals based on the final positions.

In another feature, the computer program further comprises measuring first and second RRO errors in the timing information of the S servo spirals at first and second radii during a revolution of the HDD, respectively. The computer program further comprises generating interpolated RRO errors by interpolating the first and second RRO errors and generating the timing control signals by subtracting the interpolated RRO errors from the timing information.

In another feature, the computer program further comprises generating the timing control signals that are independent of the RRO errors.

In another feature, the computer program further comprises measuring repeatable runout (RRO) and non-repeatable runout (NRRO) errors in the timing information and generating feed-forward and feedback information based on the RRO and NRRO errors, respectively. The computer program further comprises generating a collision detect signal by detecting when the read and write windows coincide and selecting one of the feedback and feed-forward information based on the collision detect signal. The computer program further comprises generating the positioning control signals based on the one of the feedback and feed-forward information.

In another feature, the computer program further comprises performing a write accounting at a first priority and processing the timing and position information at a second priority that is less than the first priority.

In another feature, the computer program further comprises positioning a read/write head of a hard disk drive (HDD) based on the positioning control signals and writing the F final servo wedges based on the timing control signals.

In still other features, the systems and methods described above are implemented by a computer program executed by one or more processors. The computer program can reside on a computer readable medium such as but not limited to memory, non-volatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a schematic of tracks of a HDD according to the prior art;

FIGS. 11A-11C depict relative positions of read and write elements of R/W heads;

DETAILED DESCRIPTION

Figure 1:
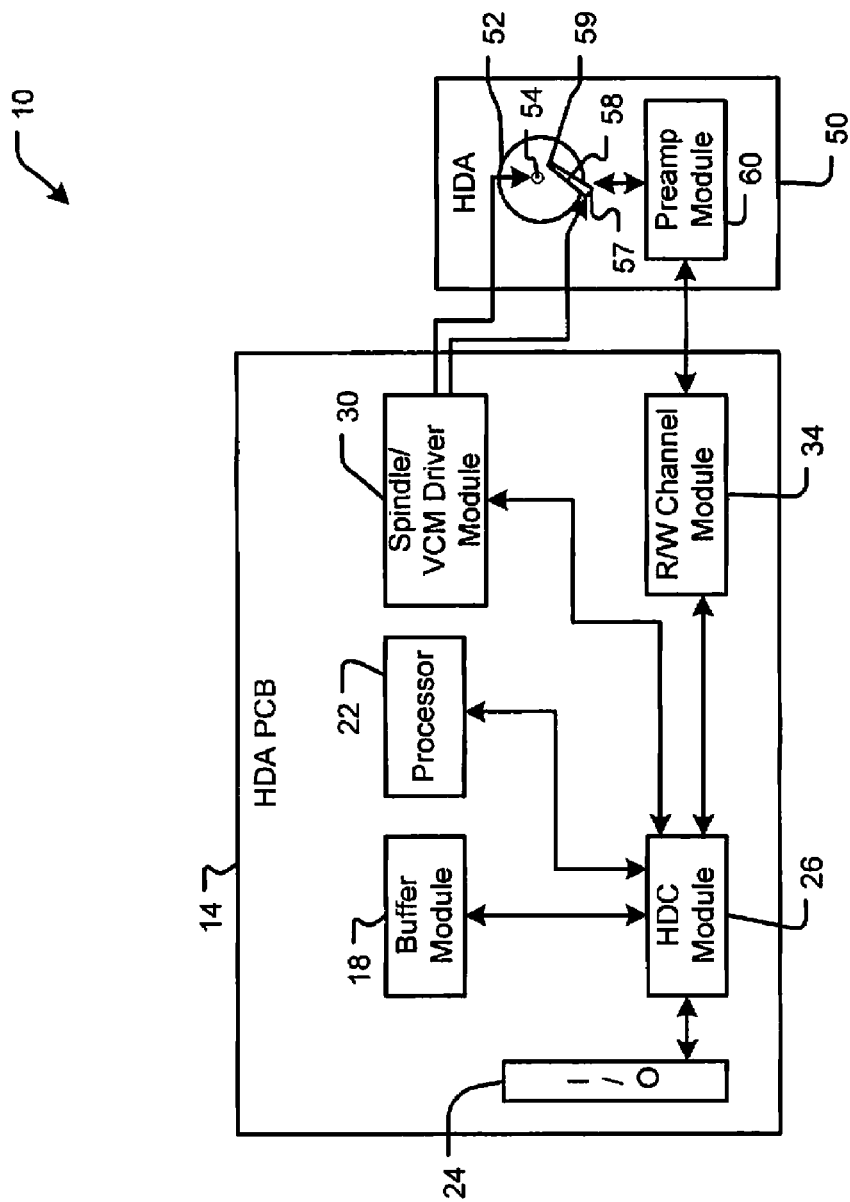
FIG. 1 is a functional block diagram of an exemplary hard disk drive (HDD) according to the prior art.
Figure 3A:
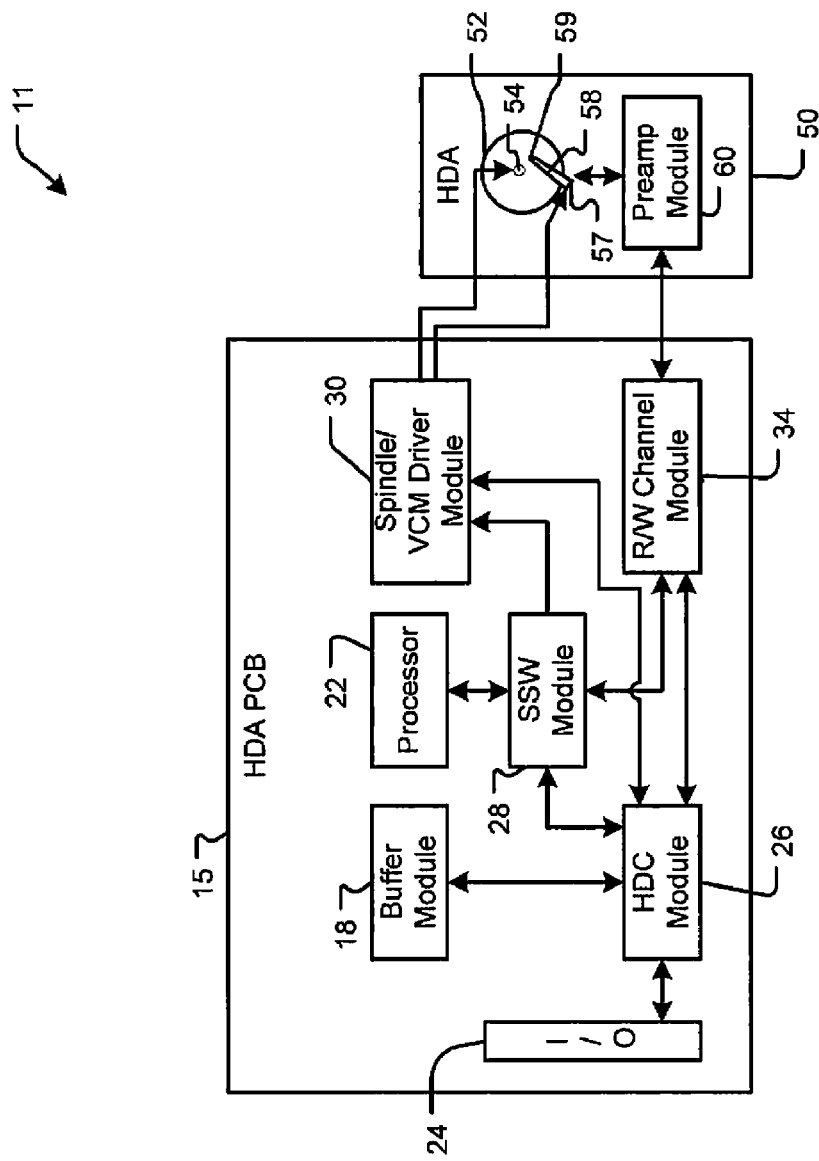
FIG. 3A is a functional block diagram of an exemplary hard disk drive (HDD) employing a self-servo-write (SSW) system according to the prior art.
Figure 3B:
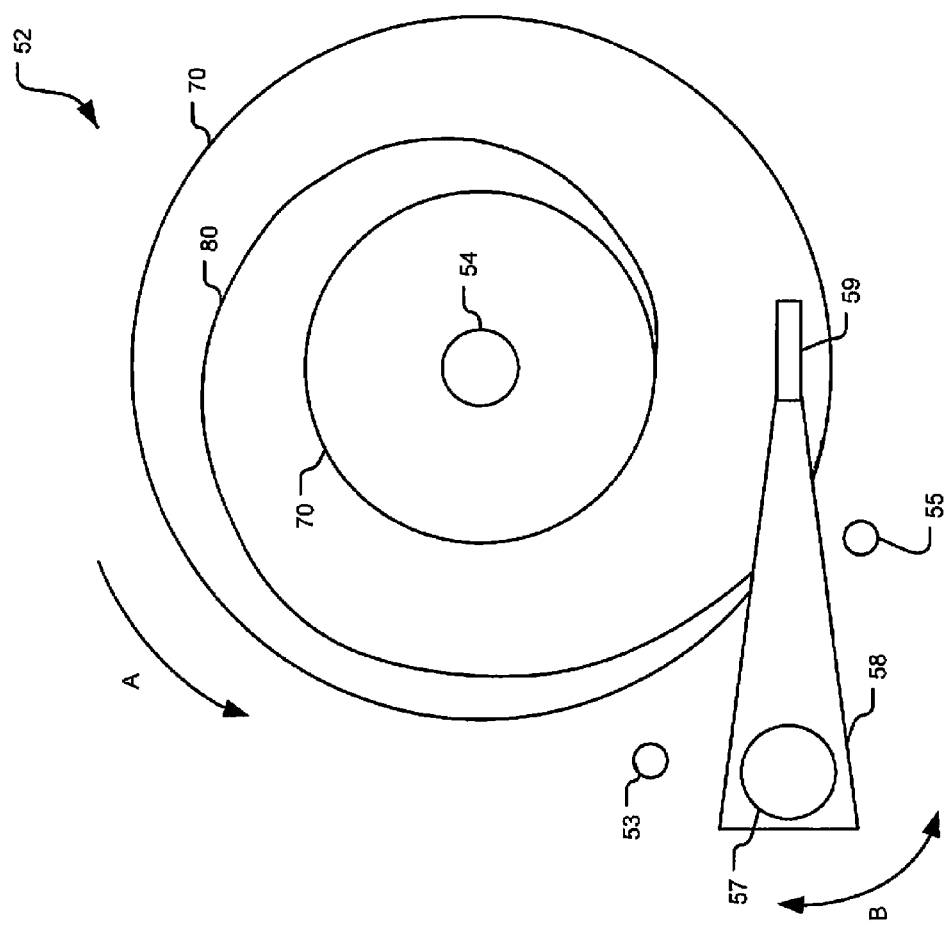
FIG. 3B depicts a servo spiral of a HDD according to the prior art.
Figure 4:
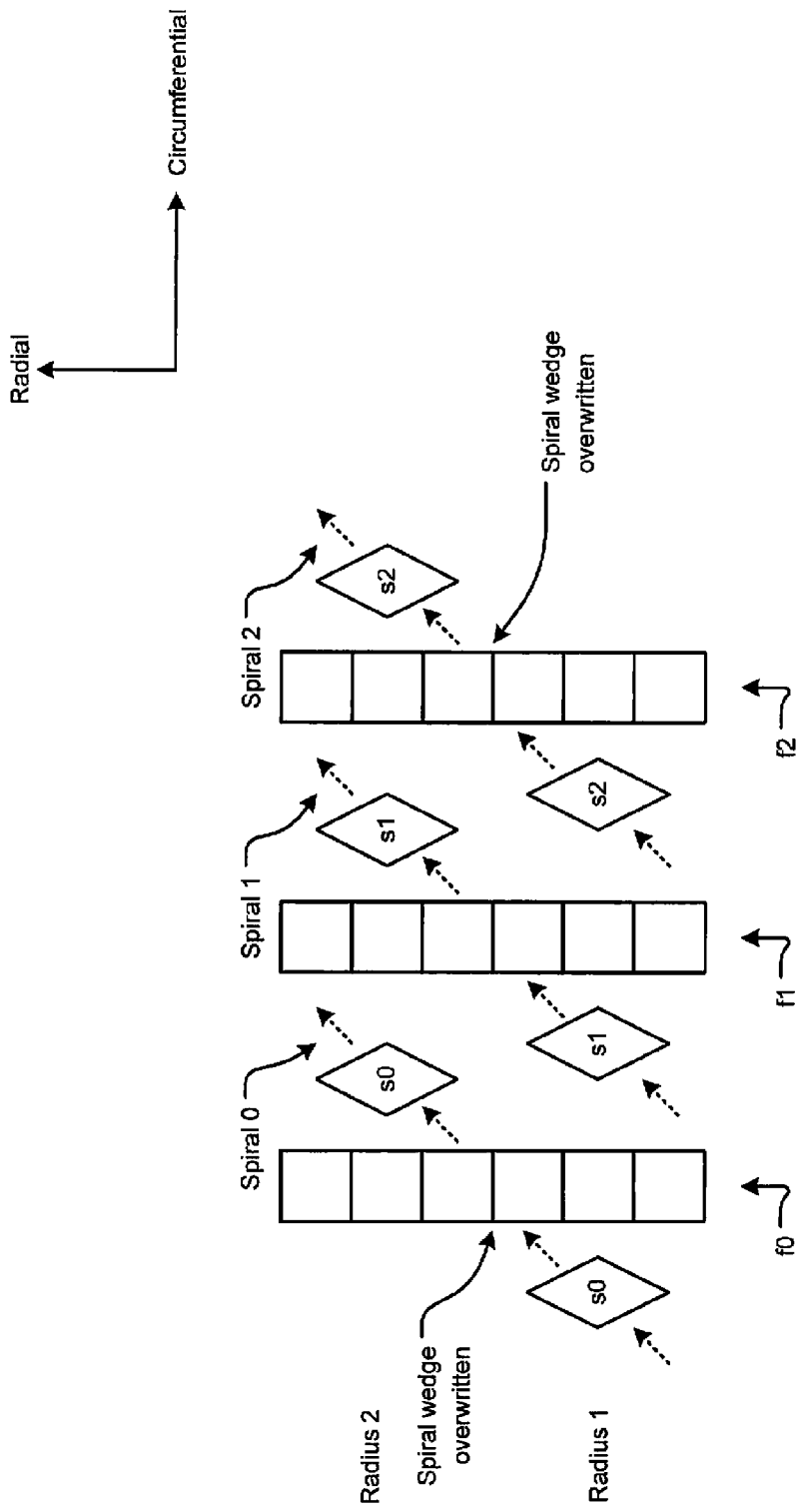
FIG. 4 depicts servo spirals and final servo wedges written in a HDD according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Many self-servo-write (SSW) systems have two limitations. First, the number of final wedges (F) that can be written per revolution is limited by the number of spirals (S) that are written per revolution. For example, most SSW systems typically write 1 final wedge for every 2 spirals. When 1 final wedge is written for every 2 spirals, the timing and positioning information for writing final wedges may be derived from spirals 1, 3, 5, . . . , and final wedges may be written over spirals 2, 4, 6, . . . Thus, to write N final wedges, 2*N spirals may have to be initially written. Writing a large number of final wedges may increase the accuracy of reading and writing data in hard disk drives (HDDs) with high track pitch (i.e., the number of tracks per inch). Thus, if more than N final wedges are desired, more than 2*N spirals may have to be written first. Writing a large number of spirals using SSW may be impractical, however, and expensive external servo-writing apparatus may have to be used instead.

Second, when the ratio of S to F is an integer, depending on the integer value of the S to F ratio, the final wedges may overwrite a definite number of spirals. This is problematic since the spirals provide timing and positioning information for writing the final wedges, and overwriting spirals reduces the amount of timing and positioning information available for accurately writing final wedges. Consequently, decreasing the number of spirals overwritten can increase the accuracy of writing the final wedges.

The present disclosure relates to SSW systems and methods that can write F final wedges by servoing on S spirals and overwriting fewer than (S/2) spirals, where F and S are integers greater than 1, and the ratio of F to S is a non-integer greater than 1. Specifically, more than S final wedges can be written using SSW by selecting a ratio of F to S greater than 1, and fewer than (S/2) spirals may be overwritten while writing F final wedges by selecting a non-integer ratio of F to S.

Figure 5:
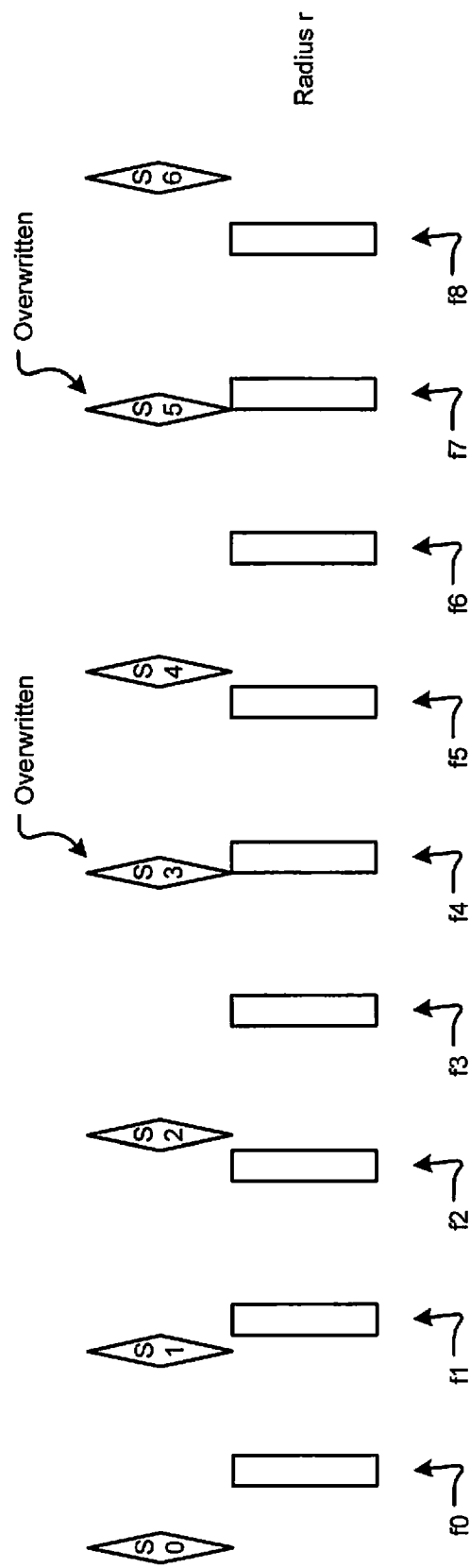
FIG. 5 depicts servo spiral wedges and final servo wedges written in a HDD according to the present disclosure.

Referring now to FIG. 5, an example of final wedges written with a non-integer F to S ratio greater than 1 is shown. In the example, 9 final wedges are written based on 7 spirals at a given radial position. Most of the 9 final wedges are written in gaps between spiral wedges instead of over the spiral wedges. Accordingly, only 2 of the 7 spiral wedges are overwritten by the final wedges. Thus, more than S final wedges can be written by selecting the F to S ratio greater than 1. Additionally, the number of spiral wedges overwritten can be decreased by properly selecting a non-integer F to S ratio and by writing most final wedges in gaps between the spiral wedges.

Figure 6:
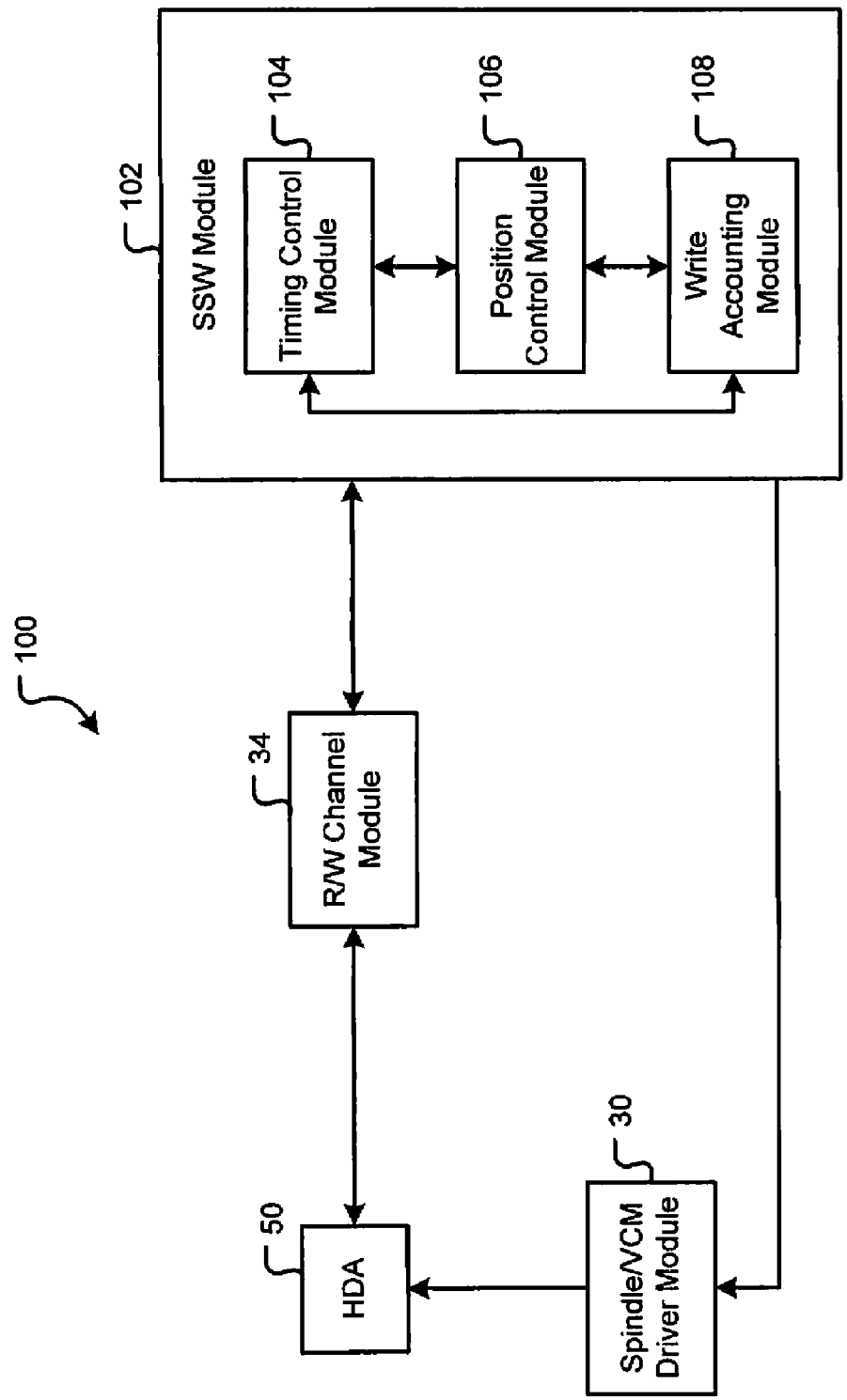
FIG. 6 is a functional block diagram of an exemplary SSW system.
Figure 8:
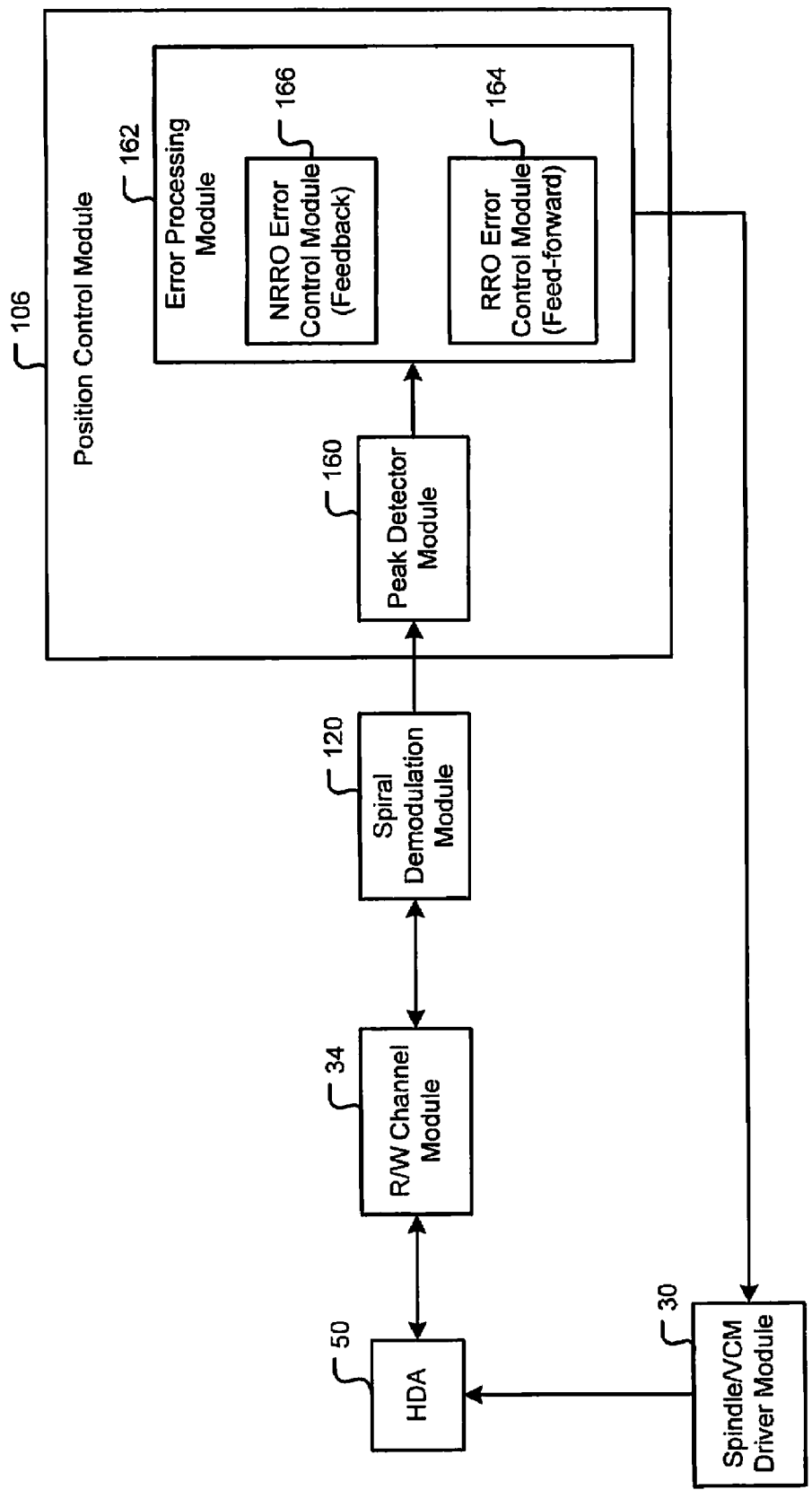
FIG. 8 is a functional block diagram of an exemplary position control module employed in a SSW system.
Figure 9:
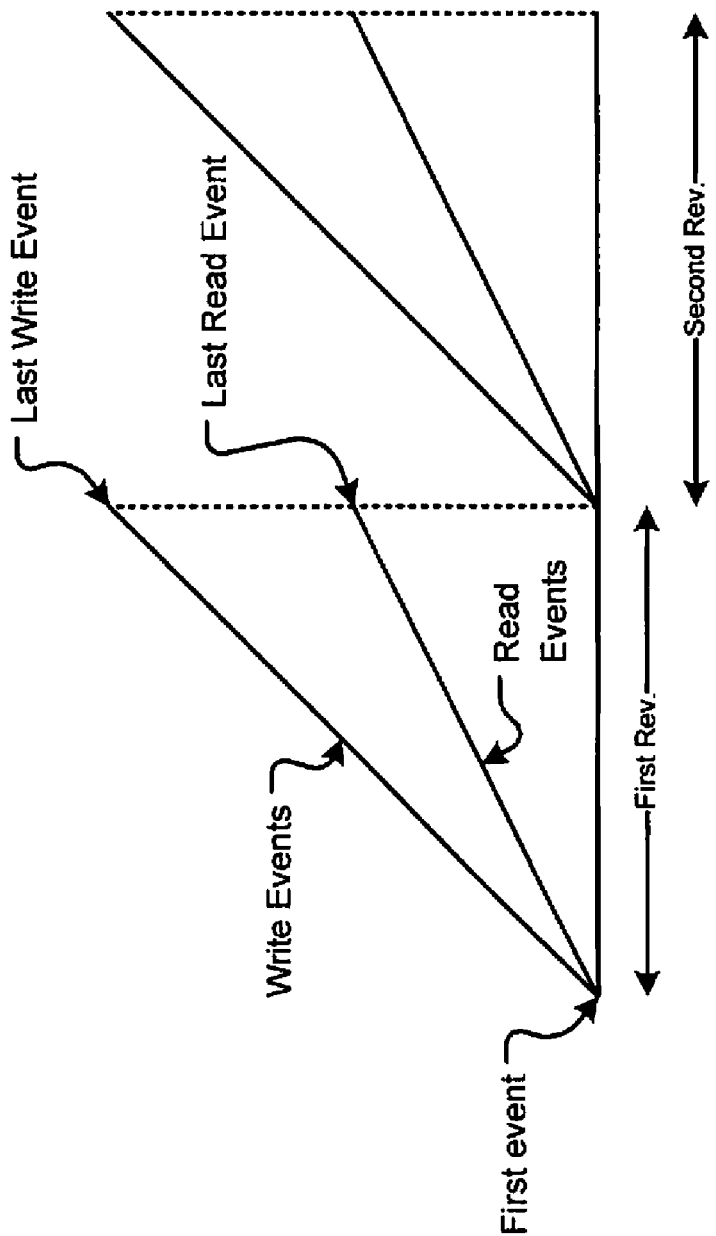
FIG. 9 depicts an exemplary relationship between read and write events according to the present disclosure.
Figure 10A:
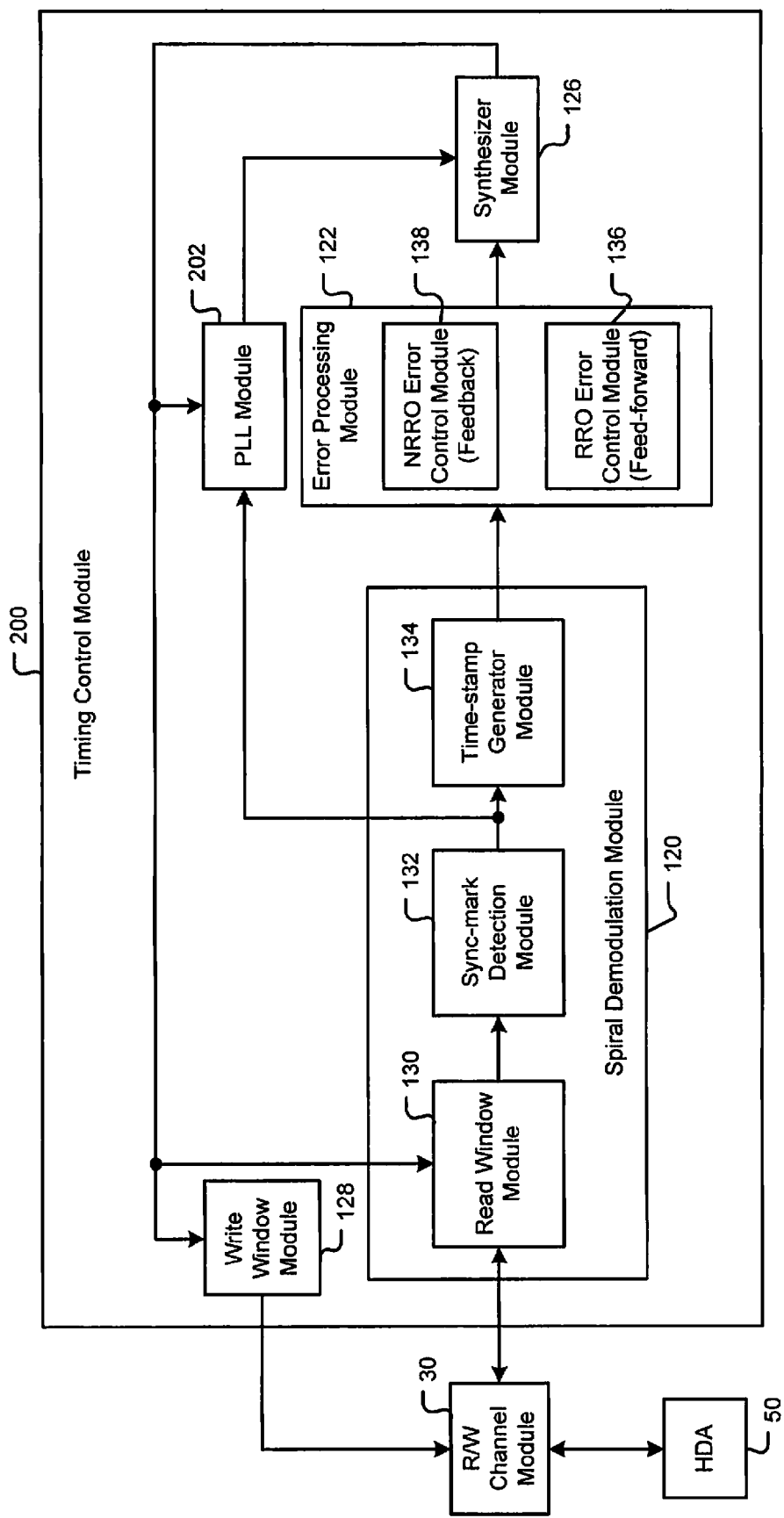
FIG. 10A is a functional block diagram of an exemplary timing control module employed in a SSW system according to the present disclosure.
Figure 10B:
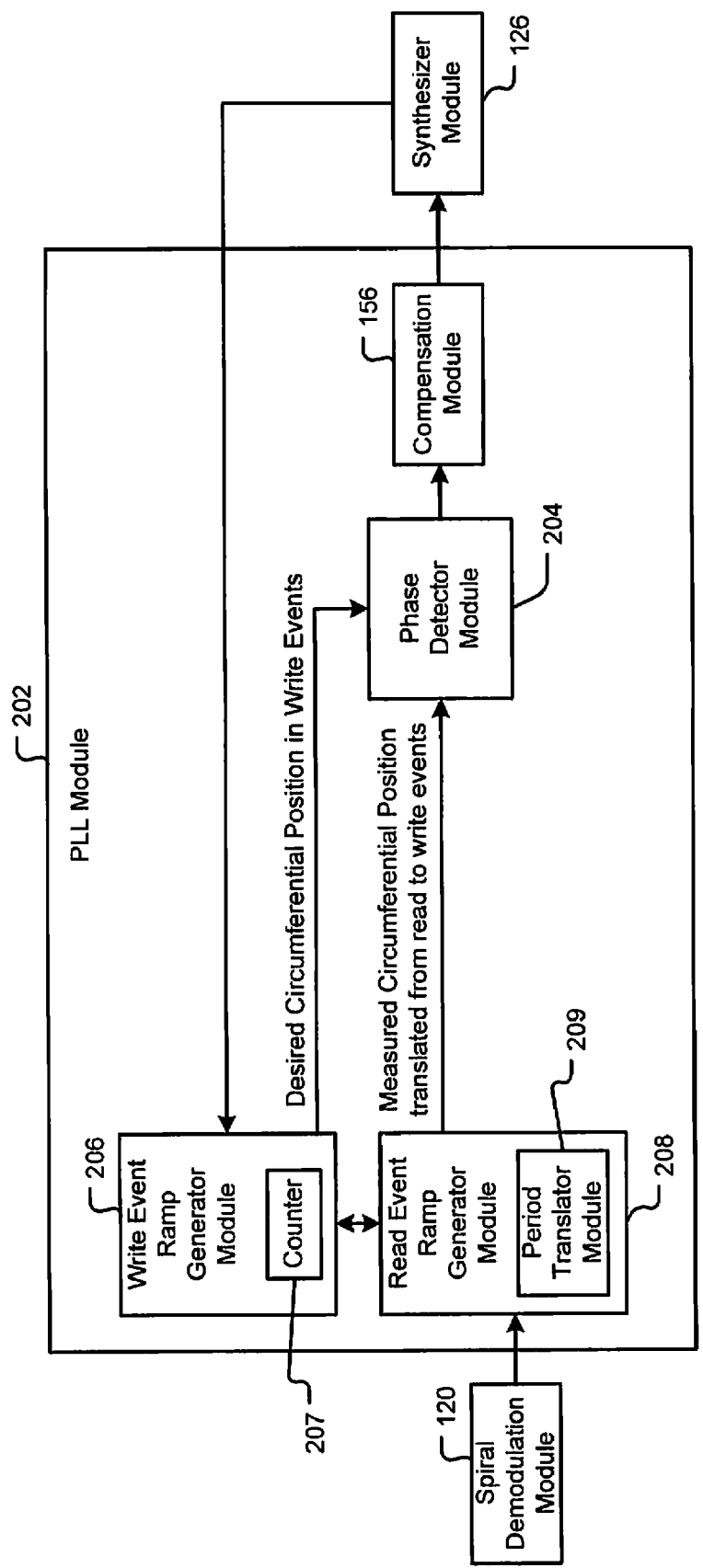
FIG. 10B is a functional block diagram of an exemplary PLL module used in a SSW system according to the present disclosure.
Figure 12:
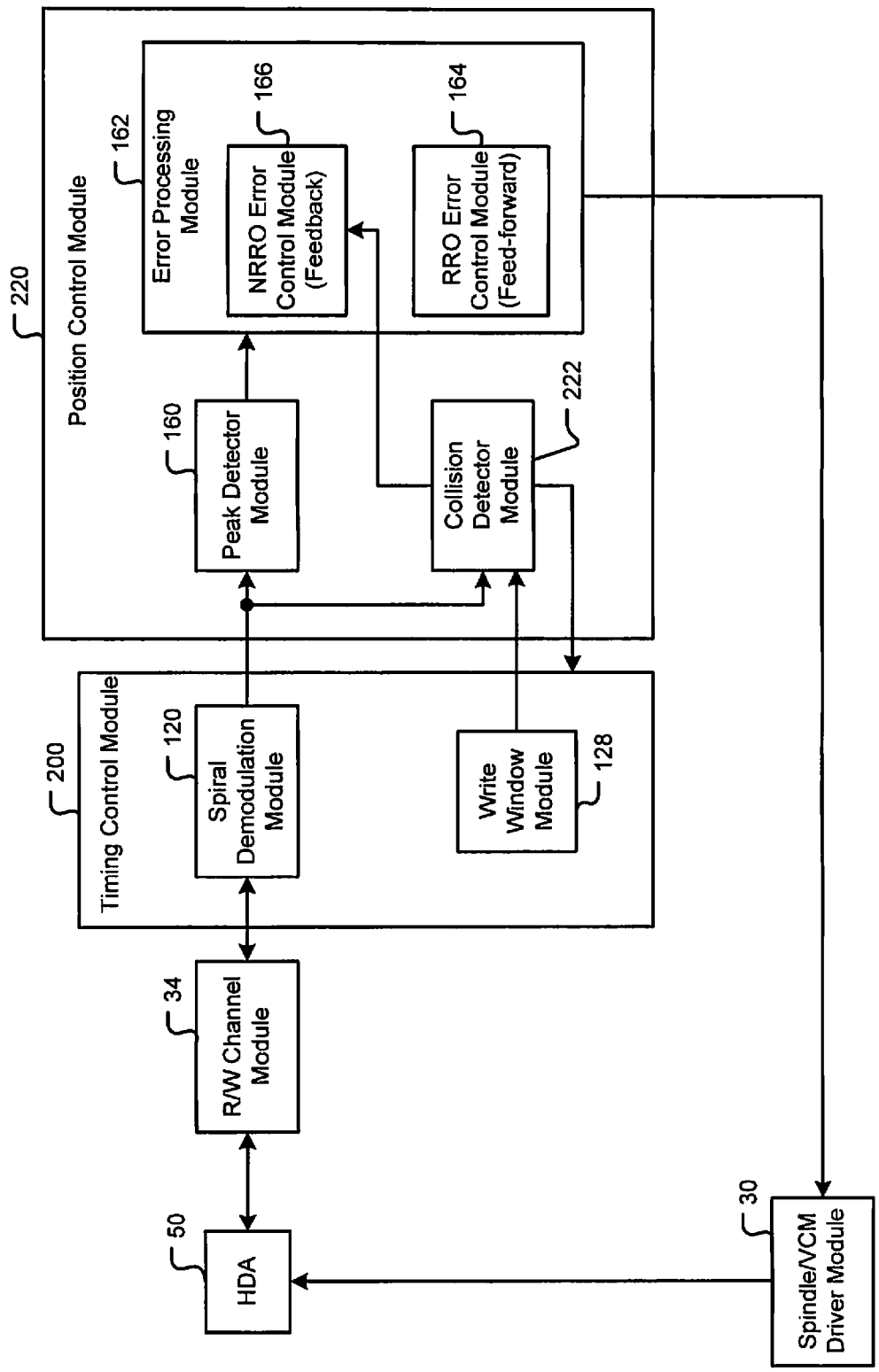
FIG. 12 is a functional block diagram of an exemplary position control module that can predict overwriting of spirals according to the present disclosure.
Figure 13A:
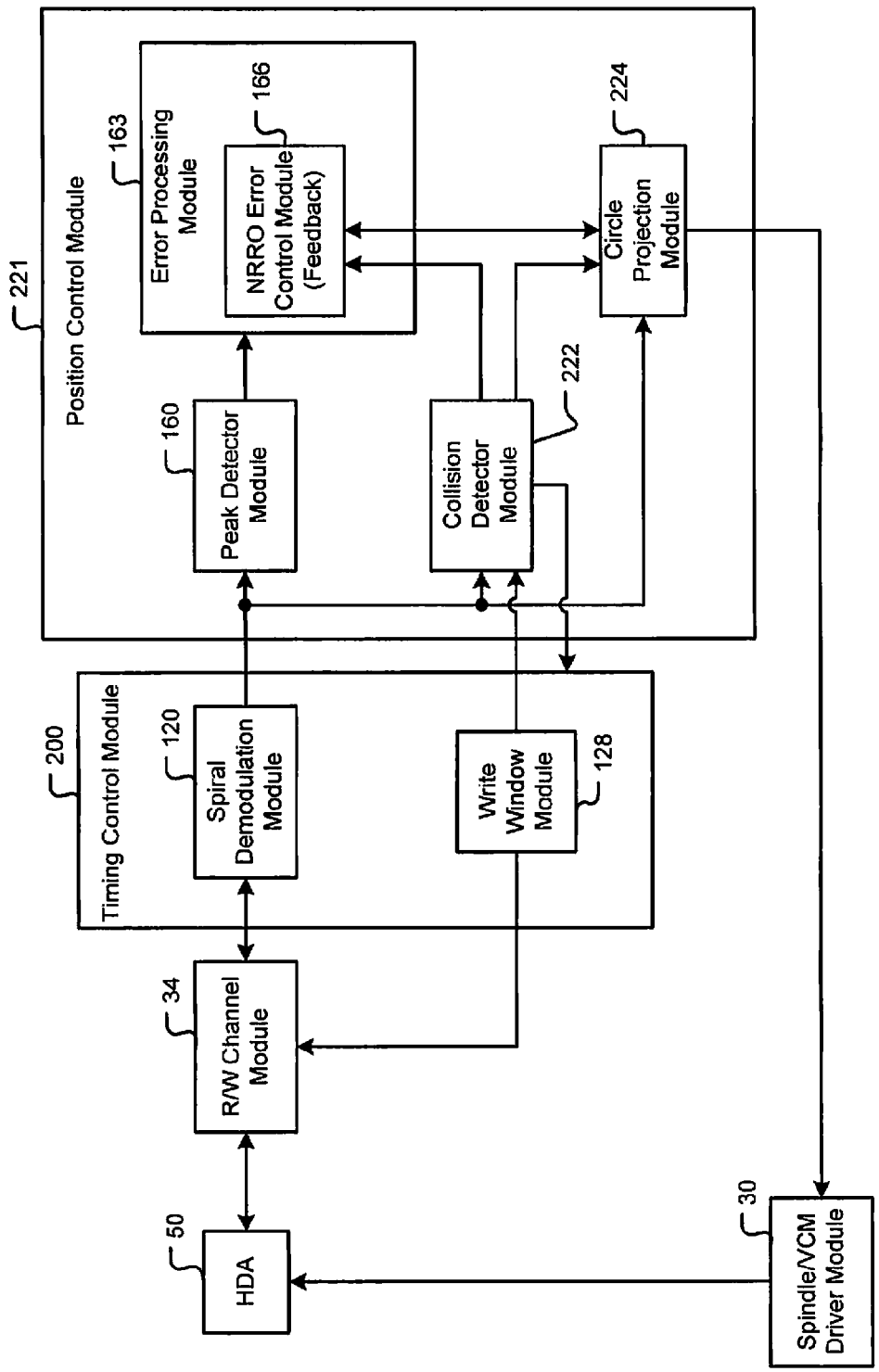
FIG. 13A is a functional block diagram of an exemplary position control module that can project positions of circles to write final servo wedges according to the present disclosure.
Figure 13B:
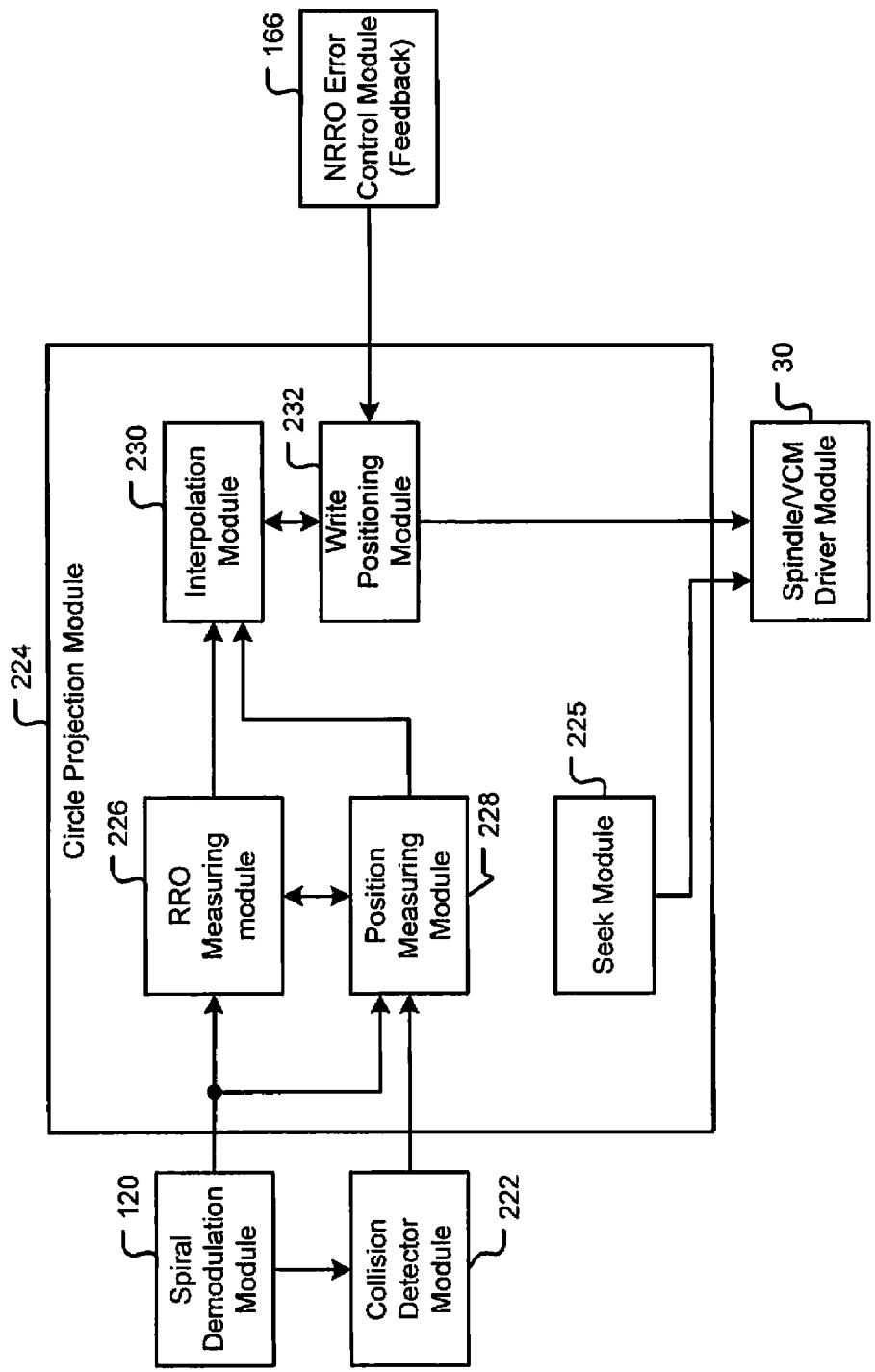
FIG. 13B is a functional block diagram of an exemplary circle projection module according to the present disclosure.
Figure 14:
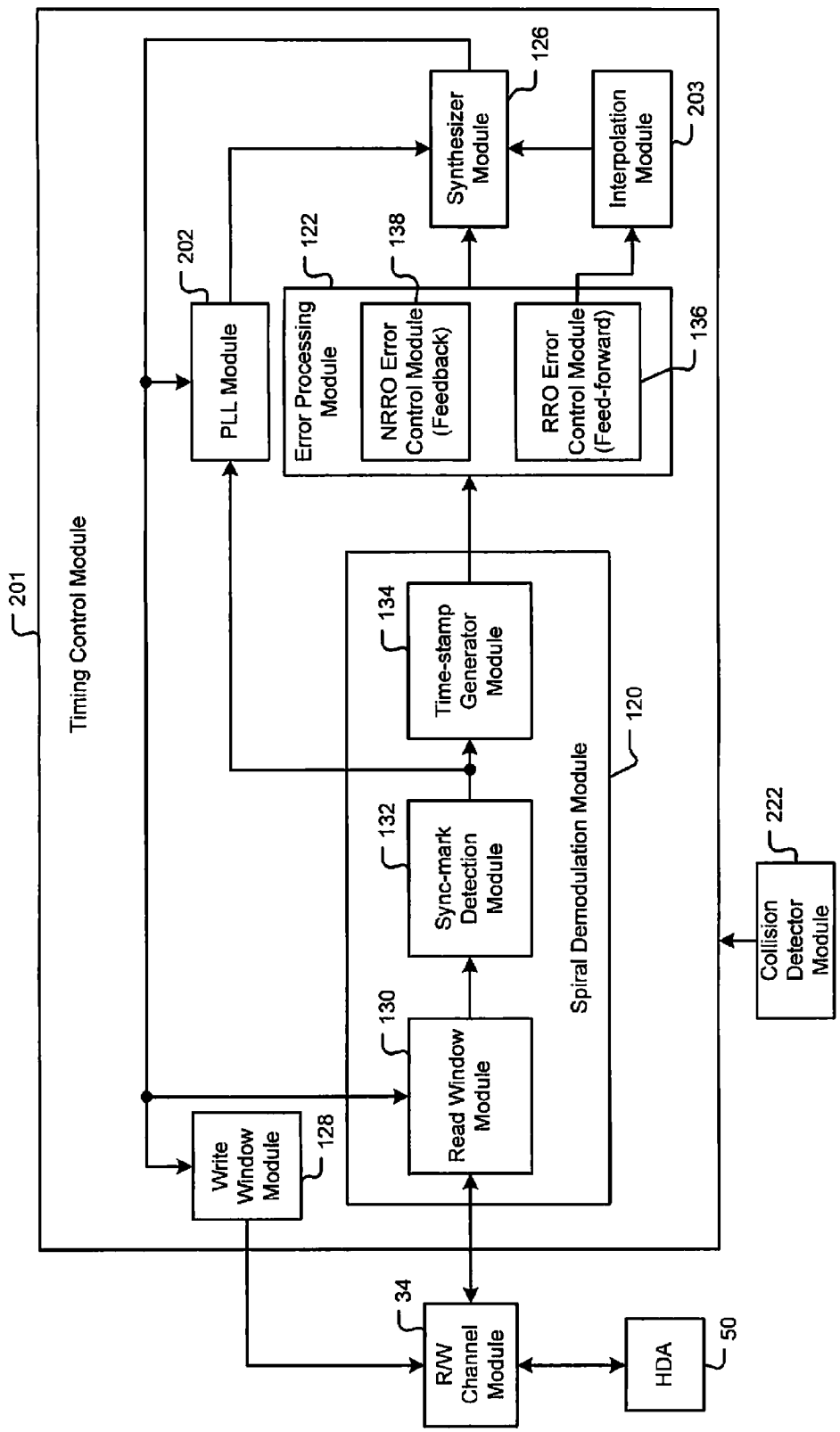
FIG. 14 is a functional block diagram of an exemplary timing control module that eliminates repeatable runout (RRO) errors according to the present disclosure.
Figure 15:
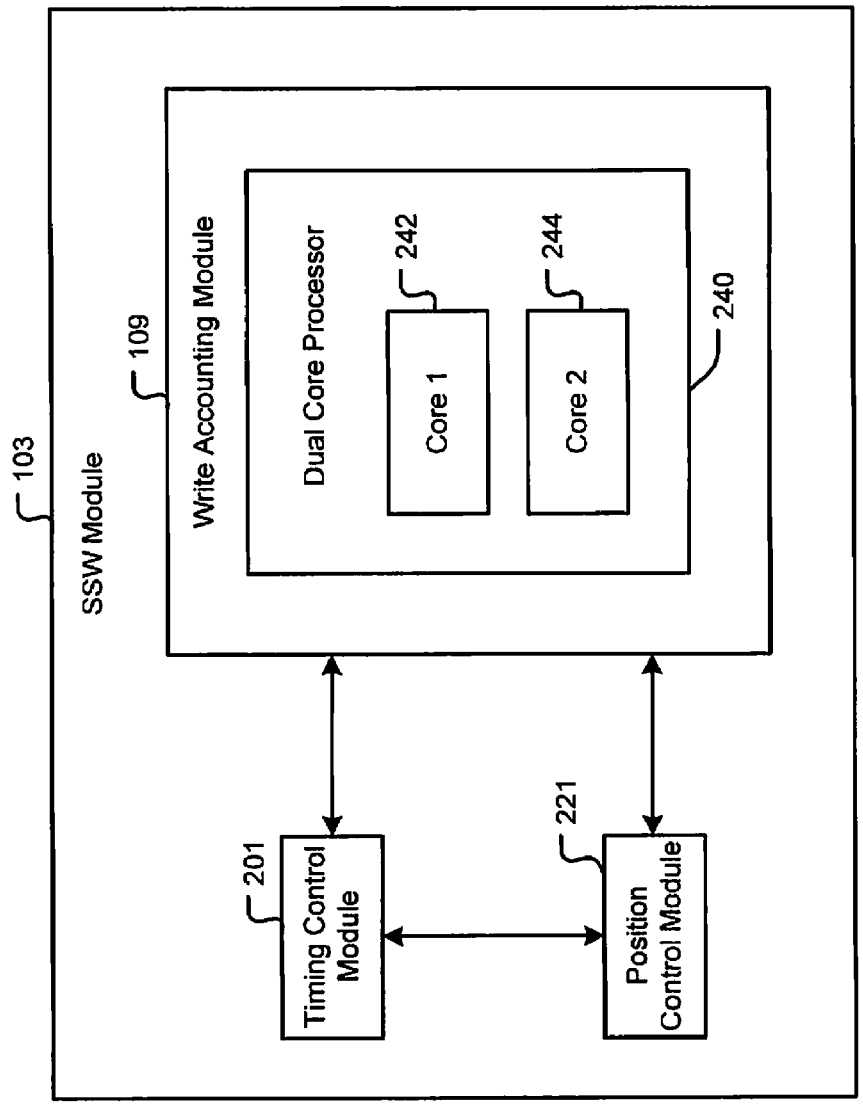
FIG. 15 is a functional block diagram of a write accounting module that performs write accounting using a dual core processor according to the present disclosure.

Before a detailed discussion, a brief overview of the drawings is presented. FIG. 6 shows an exemplary SSW system comprising timing and position control modules. FIGS. 7 and 8 show exemplary timing and position control modules of the SSW system, respectively. FIG. 9 depicts an exemplary relationship between read and write events when final servo information is written using a non-integer F to S ratio greater than 1. FIGS. 10A and 10B show a timing control module when F to S ratio is a non-integer greater than 1. FIGS. 11A-11C show relative positions of read and write elements of R/W heads. FIG. 12 shows an exemplary position control module that utilizes feed-forward and feedback control to minimize effects of repeatable runout (RRO) and non-repeatable runout (NRRO) errors. FIGS. 13A and 13B show an exemplary position control module that projects positions of circles to write final servo wedges. FIG. 14 shows an exemplary timing control module that eliminates RRO errors from being written into final wedges. FIG. 15 shows a write accounting module that performs write accounting using a dual core processor.

Figure 16:
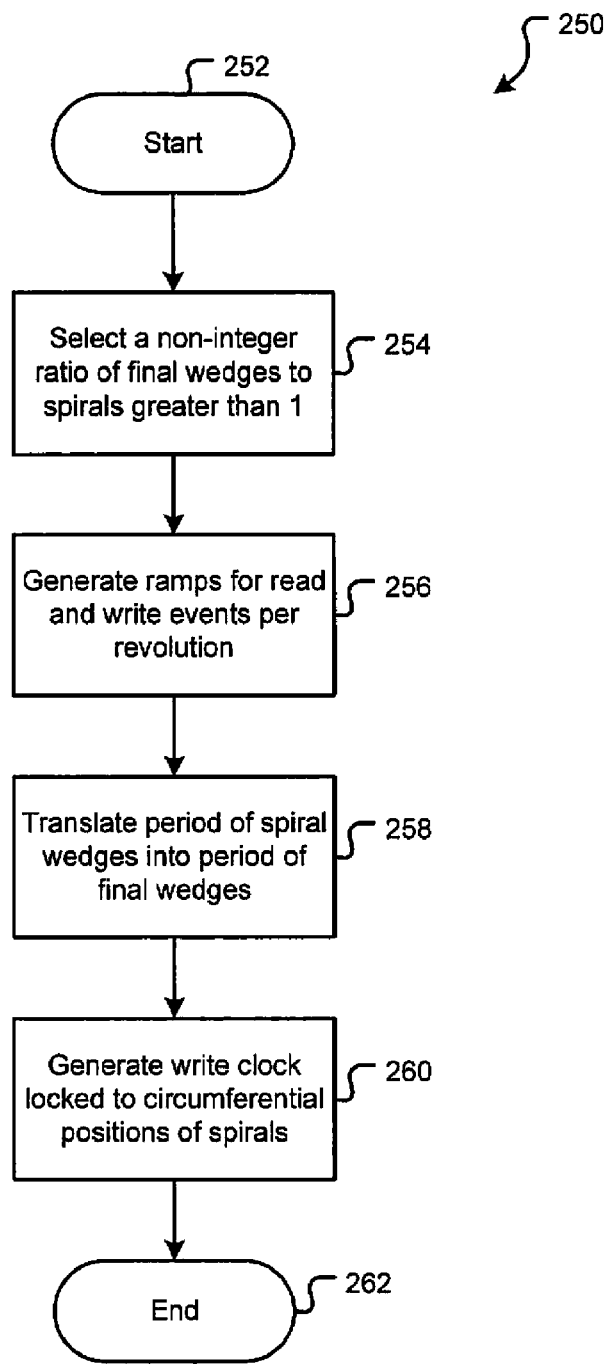
FIG. 16 is a flowchart of an exemplary method for locking a PLL when the number of final servo wedges written is greater than the number of spirals according to the present disclosure.
Figure 17:
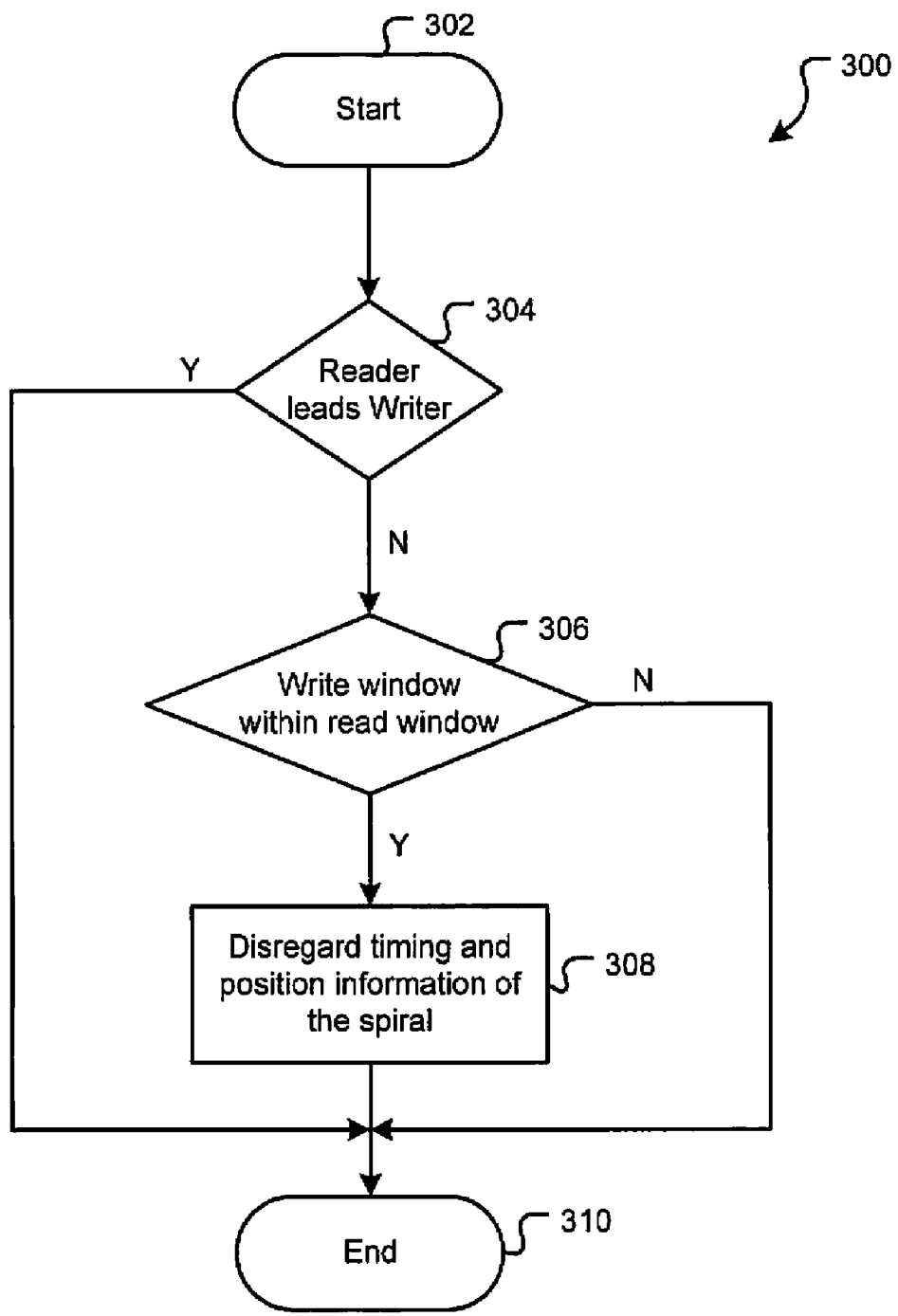
FIG. 17 is a flowchart of an exemplary method for predicting overwriting of spirals when a write element of a R/W head leads a read element according to the present disclosure.
Figure 18:
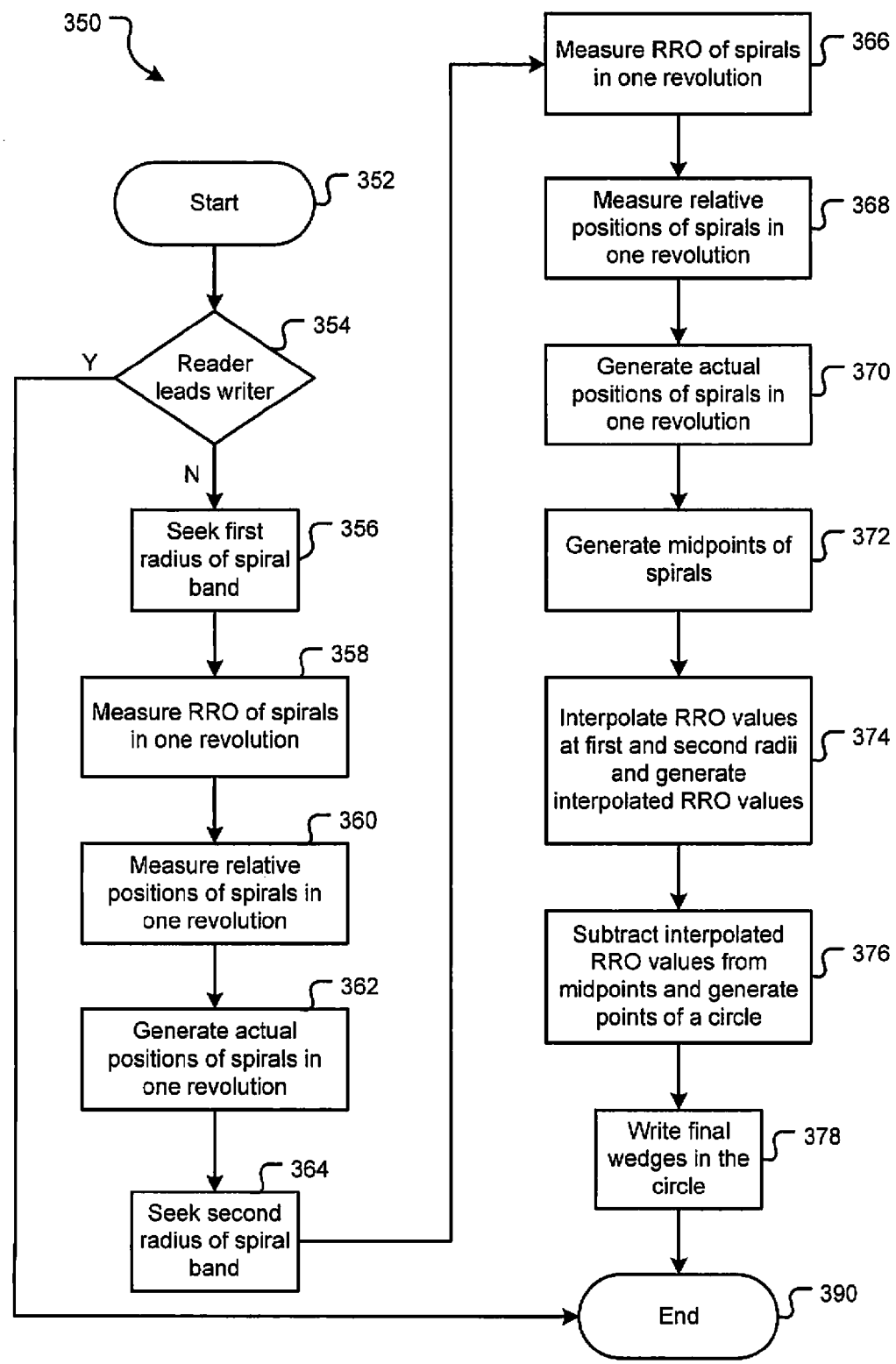
FIG. 18 is a flowchart of an exemplary method for writing final servo wedges in circles according to the present disclosure.
Figure 19:
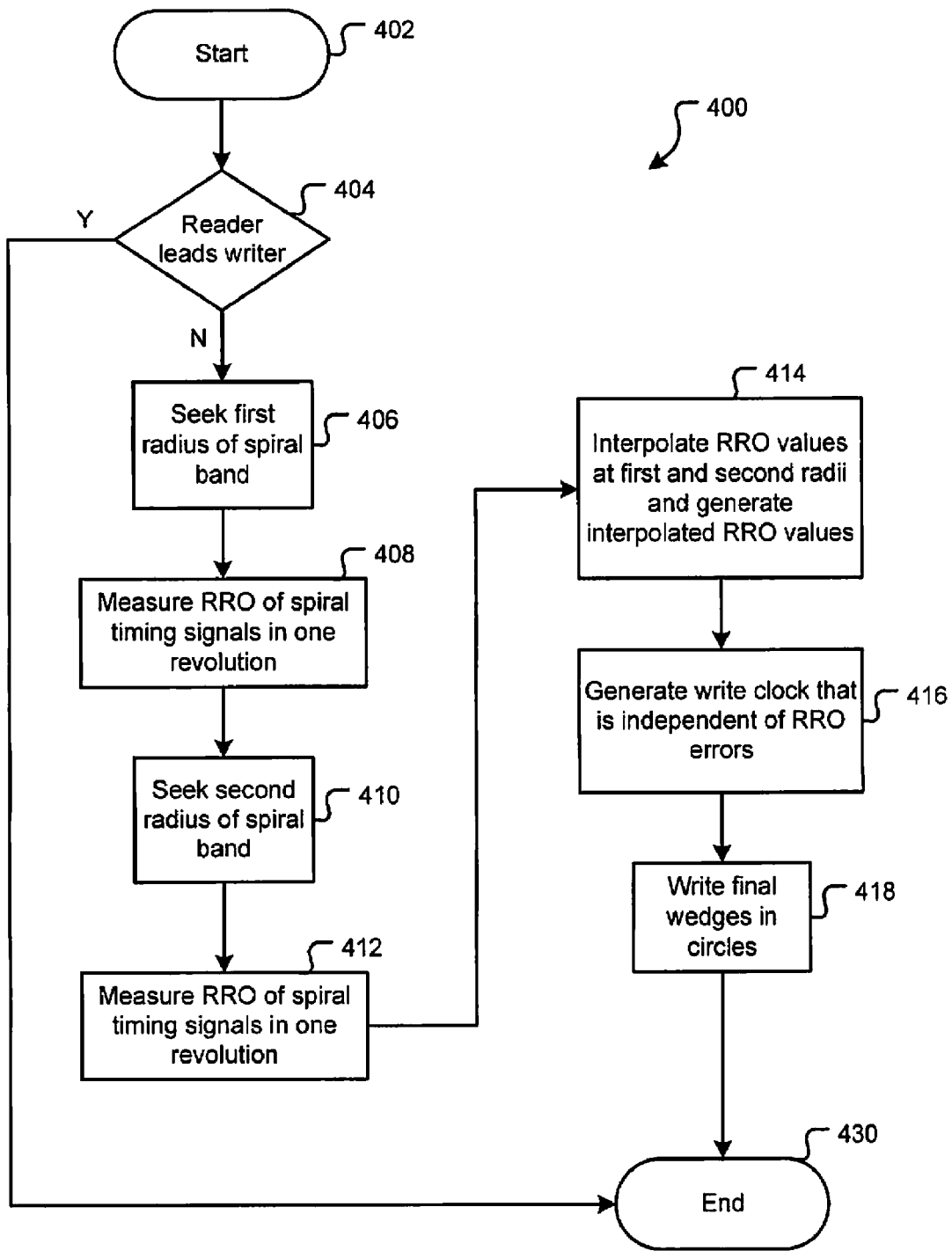
FIG. 19 is a flowchart of an exemplary method for correcting RRO errors in timing information when writing final servo wedges according to the present disclosure.
Figure 20:
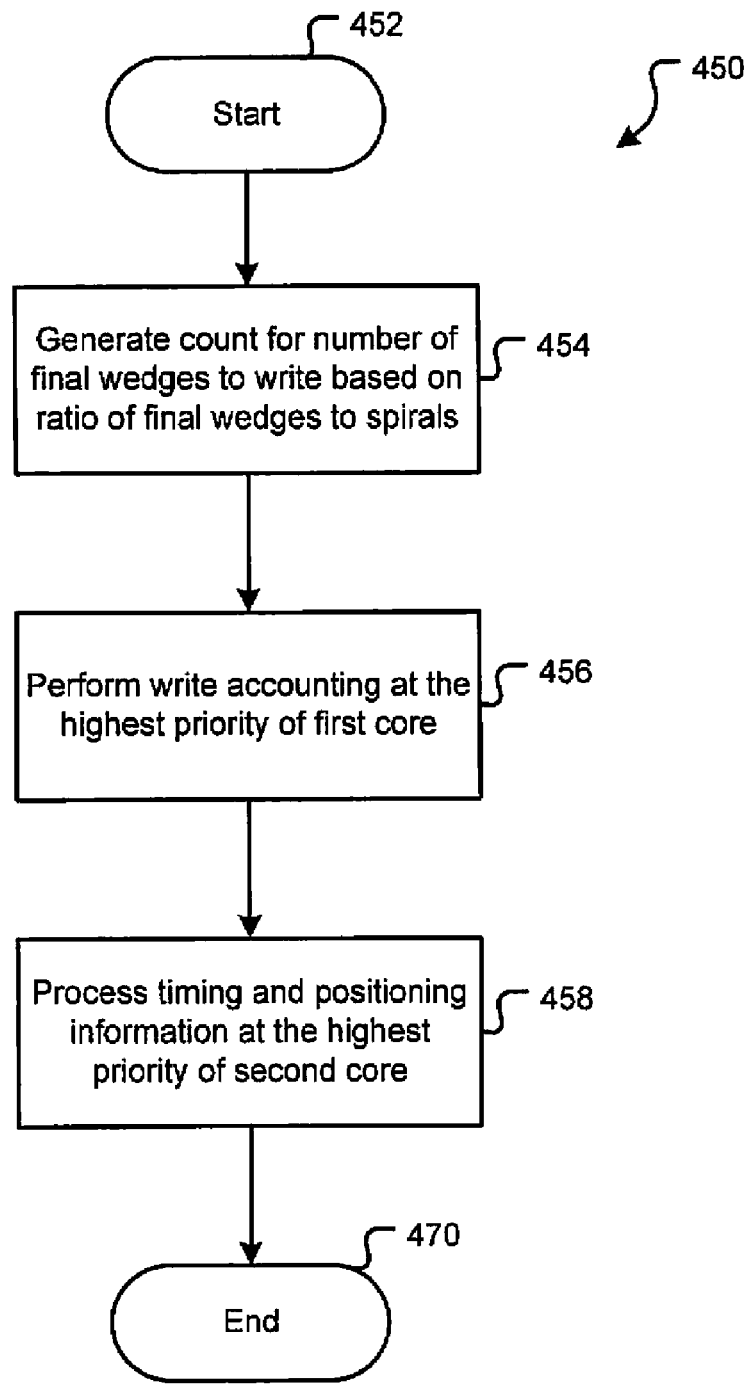
FIG. 20 is a flowchart of an exemplary method for performing write accounting using a dual core processor according to the present disclosure.

FIG. 16 shows an exemplary method for locking a PLL when the number of final servo wedges written is greater than the number of spirals. FIG. 17 shows an exemplary method for predicting overwriting of spirals when a write element of a R/W head leads a read element. FIG. 18 shows an exemplary method for writing final servo wedges in circles. FIG. 19 shows an exemplary method for correcting RRO errors in timing information when writing final servo wedges. And FIG. 20 shows an exemplary method for performing write accounting using a dual core processor. Before describing a SSW system that writes servo information with a non-integer F to S ratio greater than 1, a SSW system that writes servo information with an S to F ratio of 1/2 is described.

Referring now to FIG. 6, an exemplary SSW system 100 comprising a SSW module 102 that writes servo information with an S to F ratio of 1/2 is shown. The SSW module 102 comprises a timing control module 104, a position control module 106, and a write accounting module 108.

The timing control module 104 demodulates spiral wedges using a read window and generates timing information of spirals. Based on the timing information, the timing control module 104 generates write clock and write windows for writing the final wedges. The position control module 106 generates position information of spirals based on the timing information. Additionally, the position control module 106 generates positioning information for writing final wedges. The write accounting module 108 determines the number of final wedges to write. Additionally, the write accounting module 108 determines when to begin and end writing the final wedges based on the timing and positioning information. During SSW, write accounting is performed at the same rate at which the timing and positioning information is processed.

The SSW module 102 generates control signals based on the timing and positioning information and the information received from the write accounting module 108. Based on the control signals, the spindle/VCM driver module 30 positions the actuator arm 58, the R/W channel module 34 generates write signals, and the R/W heads 59 write the final wedges. The timing control module 104, the position control module 106, and the write accounting module 108 are described in turn below.

Figure 7A:
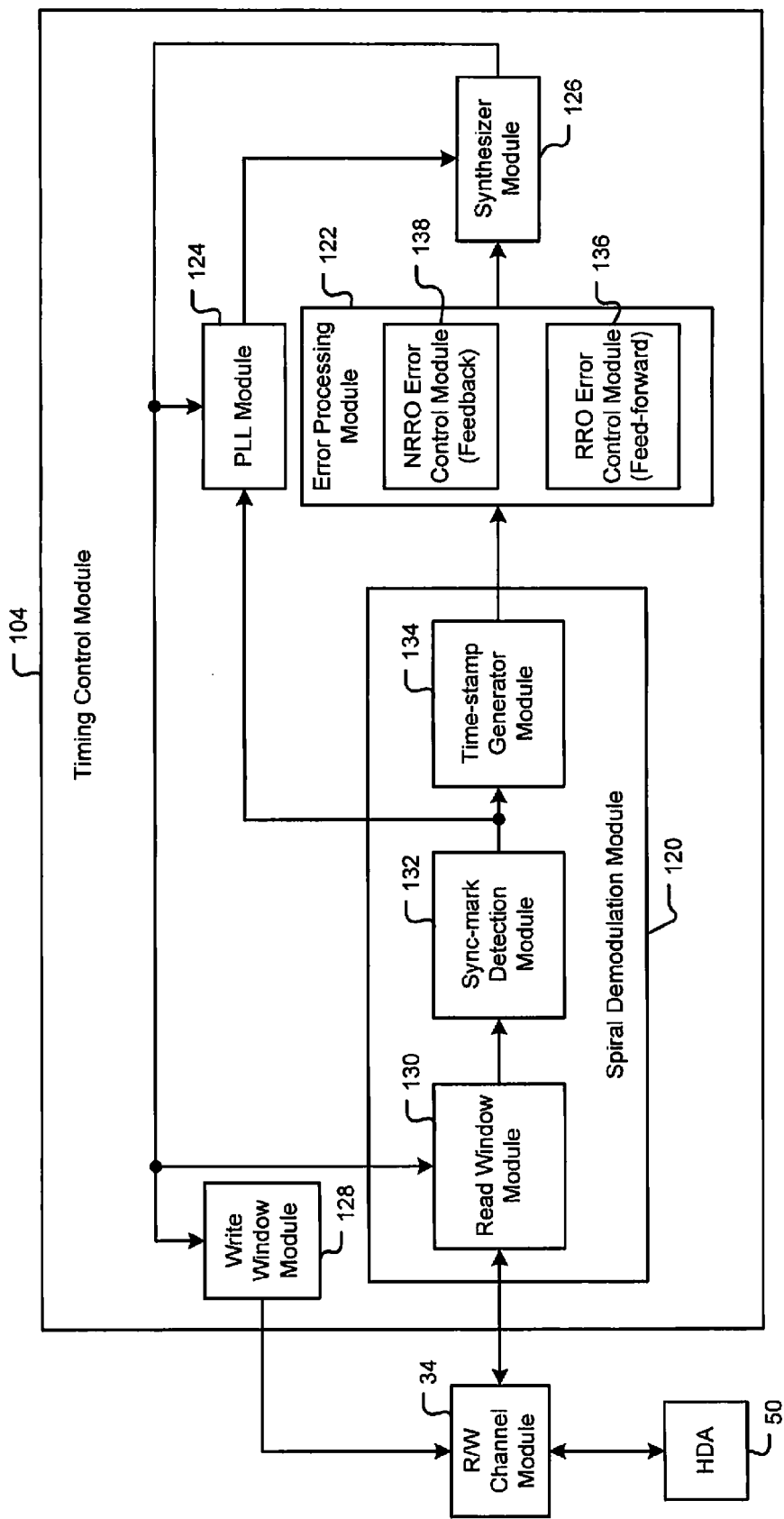
FIG. 7A is a functional block diagram of an exemplary timing control module employed in a SSW system.
Figure 7B:
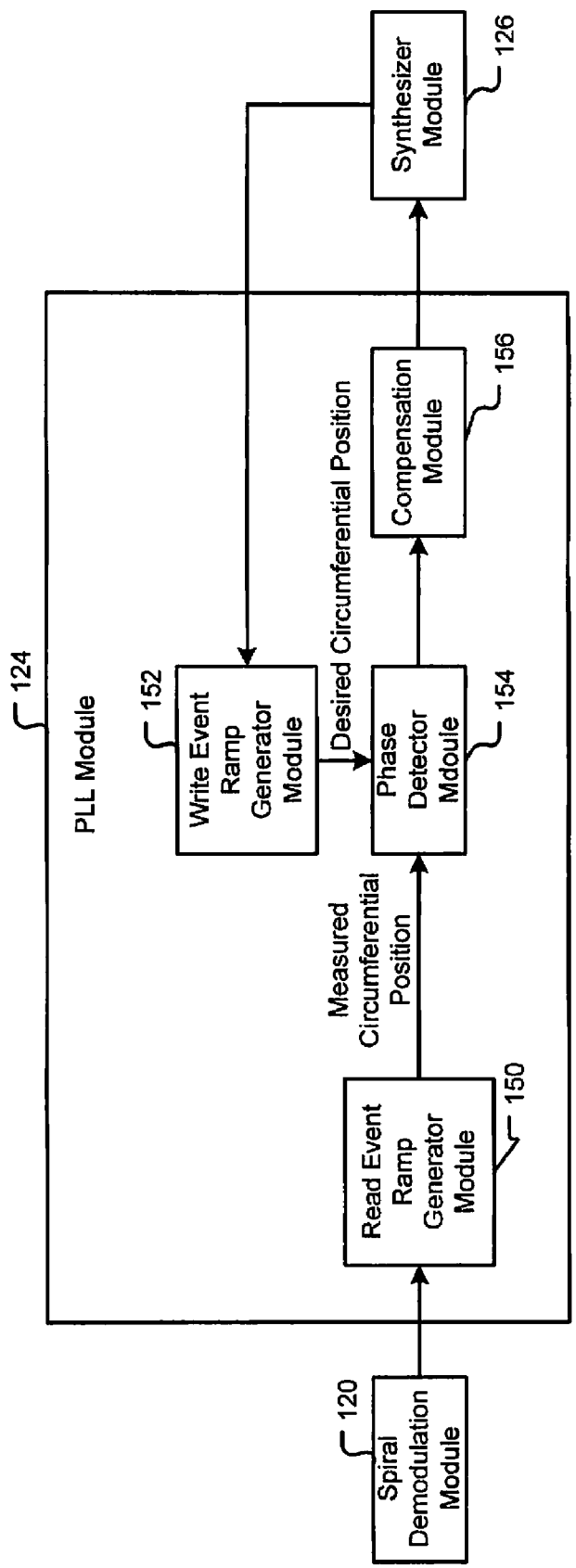
FIG. 7B is a functional block diagram of an exemplary phase-locked loop (PLL) module used in a SSW system.

Referring now to FIGS. 7A and 7B, the timing control module 104 is shown. In FIG. 7A, the timing control module 104 comprises a spiral demodulation module 120, an error processing module 122, a phase-locked loop (PLL) module 124, a synthesizer module 126, and a write window module 128.

The spiral demodulation module 120 demodulates spiral wedges during servoing and generates timing information of spirals. The spiral demodulation module 120 comprises the read window module 130, a sync-mark detection module 132, and a time-stamp generator module 134. The read window module 130 positions a read window over spirals based on clock signals received from the synthesizer module 126. The sync-mark detection module 132 detects sync-marks of spiral wedges when the read window is positioned over spiral wedges. The time-stamp generator module 134 generates time stamps when the sync-marks are detected.

The error processing module 122 processes repeatable and non-repeatable errors in the timing information generated by the spiral demodulation module 120. The error processing module 122 comprises a RRO error control module 136 and a NRRO error control module 138. The RRO error control module 136 detects RRO errors in the timing information that may be caused by factors including spindle eccentricity and generates feed-forward information. Based on the feed-forward information, the timing control module 104 can predict the timing for writing final wedges in circles. The NRRO error control module 138 detects NRRO errors in the timing information that may be caused by factors including disk vibration and bearing defects and generates feedback information.

The synthesizer module 126 synthesizes read and write clock signals based on a control signal generated by the PLL module 124 by utilizing the feed-forward and feedback information. The read window module 130 positions the read window over spirals based on the read clock signals. The write window module 128 generates write windows for writing final wedges based on the write clock signals.

In FIG. 7B, the PLL module 124 shown. The PLL module 124 is synchronized to the sync-marks. The PLL module 124 comprises a read event ramp generator module 150, a write event ramp generator module 152, a phase detector module 154, and a compensation module 156. The read and write event ramp generator modules 150, 152 generate read and write ramps based on the number of read and write events (i.e., M and N, respectively) per revolution. M and N represent the number of spiral control events divided by 2. For example, M and N represent the number of read and write events per revolution, respectively. When the ratio of S to F is 1/2, M=N, and translation of periods of spiral wedges into periods of final wedges is unnecessary.

The read and write event ramp generator modules 150, 152 generate circumferential positions based on the timing signals received from the spiral demodulation module 120 and write clock signals generated by the synthesizer module 126, respectively. The signals generated by the read and write event ramp generator modules 150, 152 represent desired and measured circumferential positions, respectively. The phase detector module 154 detects a difference in phases of the signals received from the read and write event ramp generator modules 150, 152. The compensation module 156 compensates the phase difference and generates the control signal that is input to the synthesizer module 126.

Referring now to FIG. 8, the position control module 106 comprises a peak detector module 160 and an error processing module 162 that includes a RRO error control module 164 and an NRRO error control module 166. The peak detector module 160 detects peaks of spiral wedges based on the timing information received from the spiral demodulation module 120 and generates position information that indicates radial positions of spirals. The RRO and NRRO error control modules 164, 166 detect RRO and NRRO errors in the position information and generate feed-forward and feedback information, respectively. Based on the feed-forward information, the position control module 106 can predict positions of circles for writing final wedges. The feedback information provides information regarding the non-repeatable errors when the final wedges are written in circles.

When the ratio of F to S is changed from less than 1 to a non-integer greater than 1, the timing control module 104, the position control module 106, and the write accounting module 108 of the SSW module 102 are modified as follows. The PLL module 124 of the timing control module 104 is modified since the final wedges F are written at a faster rate than the rate at which the spirals S are read. A collision detector module is added to the position control module 106 for detecting when the read and write windows may coincide (i.e., for predicting when a spiral may be overwritten) so that the timing and positioning information of that spiral can be disregarded. Interpolation modules are added to the position control module 106 and the timing control module 104 to eliminate the RRO errors from the positioning and timing information so that the final wedges can be accurately written in circles. Finally, a dual-core processor may be added to the write accounting module 108 so that write accounting and processing of timing and positioning information can be performed by separate cores at the highest priority of the respective cores. The modifications are discussed in turn below.

Referring now to FIG. 9, a relationship between the rates at which write and read events occur per revolution is shown when the ratio of F to S is a non-integer greater than 1. Since the write events occur at a faster rate than the read events, the PLL module 124 is modified as follows:

Referring now to FIGS. 10A and 10B, a timing control module 200 that generates timing information when the F to S ratio is greater than 1 is shown. In FIG. 10A, the timing control module 200 comprises a PLL module 202, the spiral demodulation module 120, the error processing module 122, the synthesizer module 126, and the write window module 128. In FIG. 10B, the PLL module 202 comprises a read event ramp generator module 208, a write event ramp generator module 206, a phase detector module 204, and the compensation module 156. The read and write event ramp generator modules 208, 206 generate circumferential positions measured in read and write events based on timing signals received from the spiral demodulation module 120 and write clock signals generated by the synthesizer module 126, respectively.

Additionally, the write event ramp generator module 206 includes a counter 207, and the read event ramp generator module 208 includes a period translator module 209. The write and read event ramp generator modules 206, 208 generate write and read ramps based on the number of write and read events (i.e., N and M, respectively) per revolution, respectively. Specifically, the counter 207 counts the number of write events N per revolution. Based on the count, the write event ramp generator module 206 generates a write ramp per revolution. The read event ramp generator module 208 generates read ramps based on the number of read events M per revolution. The period translator module 209 translates periods of spiral wedges into periods of final wedges.

The phase detector module 204 compares the read and write ramps and detects a difference in phases of the read and write ramps. The compensation module 156 compensates the phase difference. Thus, the write clock that is used to write the final wedges is synchronized to the circumferential positions of the spirals read during the revolution.

Referring now to FIGS. 11A-11C, the disk geometry and design of R/W heads 59 may affect reading of spiral wedges and writing of final wedges. Specifically, the relative positions of read and write elements 59-1, 59-2 of the R/W head 59 may vary when the actuator arm 58 moves during servoing. In FIG. 11A, a read element 59-1 of the R/W head 59 may lead a write element 59-2 of the R/W head 59 when the actuator arm 58 moves towards ID. In FIG. 11B, the write element 59-2 may lead the read element 59-1 when the actuator arm 58 moves towards OD. In FIG. 11C, the read and write elements 59-1, 59-2 may have the same radial positions when the actuator arm 58 is at a mid-point between the ID and the OD.

When the read element 59-1 leads the write element 59-2 during servoing, the read element 59-1 can read the spiral wedges that are not yet overwritten by the final wedges. Accordingly, the write element 59-2 can be positioned based on spirals read by the read element 59-1 when writing final wedges. On the other hand, when the write element 59-2 leads the read element 59-1 or when the read and write elements 59-1, 59-2 have the same radial positions, the write element 59-2 may write final wedges over a spiral before the read element 59-1 can read that spiral. This may have several consequences.

For example, the spiral based on which the R/W head 59 can write final wedges may no longer be available. The timing information generated based on spirals may change. Less positioning information may be available for servoing. Calculations of RRO errors and positions of circles for writing the final wedges may be inaccurate. Writing over spirals when the write element 59-2 leads the read element 59-1, however, can be compensated for by predicting when a spiral may be overwritten and disregarding the timing and position information of that spiral as follows:

Referring now to FIG. 12, a position control module 220 comprises a collision detector module 222, the peak detector module 160, and the error processing module 162 that includes the RRO error control module 164 and the NRRO error control module 166. The collision detector module 222 receives the timing information generated by the spiral demodulation module 120 and the write window module 128. The collision detector module 222 generates a collision detect signal when the write window generated by the write window module 128 is within (i.e., coincides with) the read window. The NRRO error control module 166 generates feedback information. Based on the collision detect signal, the feedback information is used in position control, or only the feed-forward information is used.

The final wedges can be written in circles if the RRO errors present in the spirals can be detected and eliminated before writing the final wedges. The RRO errors can be accurately detected when the position information of all the spirals is available. The position information of all the spirals, however, may not be available when some of the spirals are overwritten by the final wedges, particularly when the write element 59-2 leads the read element 59-1. Accordingly, before writing the final wedges, the RRO errors may be measured based on available spirals. An interpolation scheme may be used to predict the repeatable errors so that the errors can be disregarded and positions of circles for writing final wedges can be accurately calculated.

Referring now to FIGS. 13A and 13B, a position control module 221 that can detect and eliminate RRO errors and that can accurately project positions of circles for writing final wedges is shown. In FIG. 13A, the position control module 221 comprises the peak detector module 160, the collision detector module 222, a circle projection module, and an error processing module 163 that includes the NRRO error control module 166. In FIG. 13B, the circle projection module 224 comprises a seek module 225, a RRO measuring module 226, a position measuring module 228, an interpolation module 230, and a write positioning control module 232. The circle projection module 224 detects and eliminates repeatable errors and accurately projects positions of circles for writing final wedges as follows:

The seek module 225 issues a seek command to seek a group or a band of spirals. A radial distance in a band depends on the linearity of the spirals, which in turn depends on disk geometry and other factors present when spirals are written. Based on the seek command, the spindle/VCM driver module 30 positions the R/W head 59 at a first radius, which is one extremity of the band of spirals.

The RRO measuring module 226 and the position measuring module 228 receive position information generated by the spiral demodulation module 120. Based on the position information, the RRO measuring module 226 measures a first set of RRO values for all the spirals read at the first radius during one revolution. The position measuring module 228 measures a first set of relative positions of all the spirals at the first radius during one revolution. The position measuring module 228 generates actual positions of the spirals at the first radius by subtracting the RRO values from the relative positions of the respective spirals.

Subsequently, the seek module 225 issues another seek command for the R/W heads to seek a second radius, which is another extremity of the band. Based on the position information received from the spiral demodulation module 120, the RRO measuring module 226 measures a second set of RRO values for all the spirals, and the position measuring module 228 measures a second set of relative positions of all the spirals read at the second radius. The position measuring module 228 generates actual positions of the spirals at the second radius by subtracting the RRO values from the relative positions of the respective spirals. In some implementations, the accuracy of the measurements may be increased by making the measurements in more than one revolution and averaging the measurements.

Typically, the RRO errors written into the spirals are radially coherent. Accordingly, if the positions of a spiral at points A and B are known, a position C of the spiral at a midpoint of A and B can be estimated using linear or non-linear interpolation.

The interpolation module 230 interpolates the RRO values of the spirals between first and second radii and generates interpolated RRO values. The interpolation module 230 subtracts the interpolated RRO values from the midpoints of spirals to generate positions for writing the final wedges in a circle. The type of interpolation used may depend on the length of the band. For example, linear interpolation may be used if bands are short, and a higher order interpolation may be used if the bands are long.

The write positioning module 232 receives the positions for writing the final wedges from the interpolation module 230. Additionally, the write positioning module 232 may receive feedback from the NRRO error control module 166. The write positioning module 232 generates control signals for writing the final wedges in circles. The Spindle/VCM driver module 30 receives the control signals from the write positioning module 232 and writes the final wedges in circles.

Referring now to FIG. 14, a timing control module 201 is shown wherein interpolation may be used to eliminate RRO errors from the timing information generated by spiral demodulation module 120 when the write element 59-2 leads the read element 59-1. The timing control module 201 comprises the spiral demodulation module 120, the error processing module 122, the synthesizer module 126, the PLL module 202, and an interpolation module 203. The timing control module 201 receives the control signal from the collision detector module 222 when the write window generated by the write timing control module 128 is within (i.e., coincides with) the read window. When the control signal is received, the timing control module 201 disregards the timing information generated by the spiral demodulation module 120.

Additionally, when the circle projection module 224 calculates the RRO errors in positions of spirals at first and second radii, the RRO error control module 136 calculates RRO errors in the time stamps received from the time stamp generator module 134. The interpolation module 203 interpolates the RRO errors in the time stamps and predicts RRO errors that may be encountered in reading spirals at other radii. The synthesizer module 126 disregards the RRO errors and generates the write clock that is independent of the RRO errors.

Referring now to FIG. 15, a SSW module 103 comprising a write accounting module 109 and the timing and position control modules 201, 221 is shown. The write accounting module 109 performs write accounting faster than processing timing and position information received from the timing and position control modules 201, 221 when the F to S ratio is greater than 1. The write accounting module 109 may accomplish this in one of two ways.

In one implementation, the write accounting module 109 may include a dual core processor 240 that includes first and second cores 242, 244. The write accounting module 109 may perform write accounting using the highest priority interrupt of the first core 242 and may process the timing and position information using the highest priority interrupt of the second core 244.

Alternatively, the write accounting module 109 may include a processor having a single core. The write accounting module 109 may utilize two fast interrupts of the processor to perform write accounting and to process the timing and position information, wherein the write accounting module 109 may perform write accounting at the highest priority.

Referring now to FIG. 16, a method 250 for locking PLL begins at step 252. The write accounting module 109 selects a non-integer ratio of the number of final wedges to the number of spirals that is greater than 1 in step 254. The read and write ramp generator modules 208 and 206 generate read and write ramps based on the number of read and write events in one revolution, respectively, in step 256. The period translator module 209 translates the period of spiral wedges into the period of final wedges in step 258. The synthesizer module 126 generates the write clock that is locked to the circumferential positions of the spirals in step 260, and the method 250 ends in step 262.

Referring now to FIG. 17, a method 300 for predicting overwriting of spirals when the write element 59-2 leads the read element 59-1 begins at step 302. The collision detector module 222 determines in step 304 whether the read element 59-1 leads the write element 59-2. If true, the method 300 ends in step 310. Otherwise, the collision detector module 222 determines in step 306 whether the write window generated by the write window module 128 is within (i.e., coincides with) the read window generated by the spiral demodulation module 120. If false, the method 300 ends in step 310. Otherwise, in step 308, the collision detector module 222 generates a control signal based on which the timing control modules 200, 201 and the position control modules 220, 221 disregard the timing and positioning information generated from the spiral, respectively. The method 300 ends in step 310.

Referring now to FIG. 18, a method 350 for generating points of a circle to write final wedges begins at step 352. The collision detector module 222 determines in step 354 whether the read element 59-1 leads the write element 59-2. If true, the method 350 ends in step 390. Otherwise, the seek module 225 generates a control signal to seek a first radius of a spiral band in step 356. The RRO measuring module 226 measures the RRO errors of all the spirals in one revolution in step 358. The position measuring module 228 measures the relative positions of all the spirals in step 360. The position measuring module 228 subtracts the RRO errors from the relative positions of respective spirals and generates the actual positions of all the spirals in step 362.

The seek module 225 generates another control signal to seek a second radius of the spiral band in step 364. The RRO measuring module 226 measures the RRO errors of all the spirals in one revolution in step 366. The position measuring module 228 measures the relative positions of all the spirals in step 368. The position measuring module 228 subtracts the RRO errors from the relative positions of respective spirals and generates the actual positions of all the spirals in step 370.

The position measuring module 228 generates midpoints of the spirals in step 372. The interpolation module 230 interpolates the RRO errors measured at first and second radii and generates interpolated RRO errors in step 374. The interpolation module 230 subtracts the interpolated RRO errors from the midpoints of the spirals and generates positions of points of a circle in step 376. In step 378, the circle projection module 224 communicates the positions of points of the circle to the spindle/VCM driver module 30, which positions the actuator arm 58 at the circle, and the R/W channel module 34 writes the final wedges in the circle. The method 350 ends in step 390.

Referring now to FIG. 19, a method 400 for correcting RRO errors in the timing information generated by the spiral demodulation module 120 begins at step 402. The collision detector module 222 determines in step 404 whether the read element 59-1 leads the write element 59-2. If true, the method 400 ends in step 430. Otherwise, the seek module 225 generates a control signal to seek a first radius of a spiral band in step 406. The RRO error control module 136 measures the RRO errors in the timing information generated by the spiral demodulation module 120 in step 408. The seek module 225 generates another control signal to seek a second radius of the spiral band in step 410. The RRO error control module 136 measures the RRO errors in the timing information generated by the spiral demodulation module 120 in step 412.

The interpolation module 203 interpolates the RRO errors measured at first and second radii and generates interpolated RRO errors in step 414. The synthesizer module 126 generates the write clock that is independent of RRO errors in step 416. The write window module 128 generates write windows based on the write clock, and the R/W channel module 34 writes the final wedges in the write windows in step 418. The method 400 ends in step 430.

Referring now to FIG. 20, a method 450 for performing write accounting when the ratio of the number of final wedges to the number of spirals is greater than 1 begins at step 452. The write accounting module 109 generates the count for the number of final wedges to write based on the ratio of the number of final wedges to the number of spirals in step 454. The write accounting module 109 performs write accounting at the highest priority of the first core 242 of the dual core processor 240 in step 456. The write accounting module 109 processes the timing and positioning information at the highest priority of the second core 244 of the dual core processor 240 in step 458. Alternatively, the write accounting module 109 utilizes two fast interrupts of a processor when the processor has a single core and performs write accounting at the highest priority. The method 450 ends in step 470.

Figure 21B:
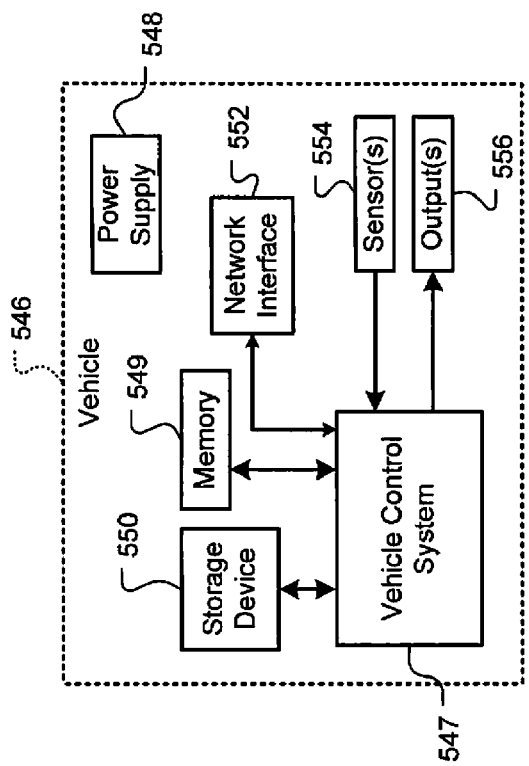
FIG. 21B is a functional block diagram of a vehicle control system.
Figure 21A:
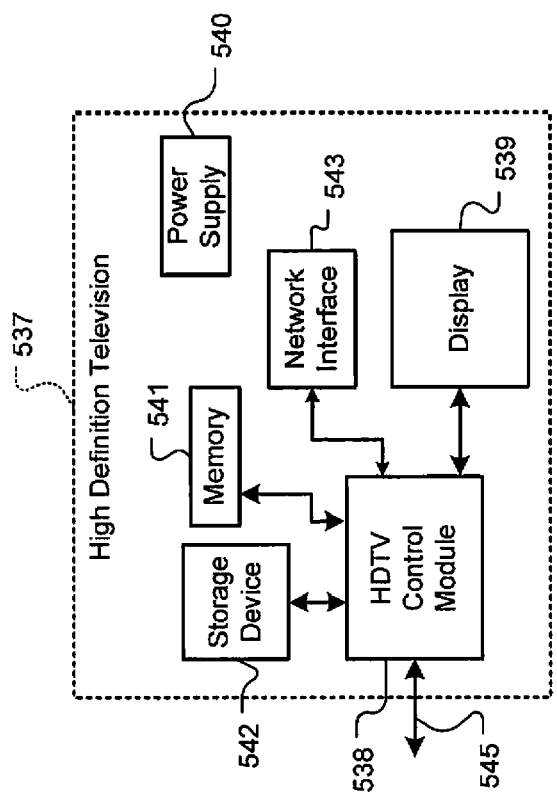
FIG. 21A is a functional block diagram of a high definition television.

Referring now to FIGS. 21A-21E, various exemplary implementations incorporating the teachings of the present disclosure are shown. In FIG. 21A, the teachings of the disclosure can be implemented in a storage device 542 of a high definition television (HDTV) 537. The HDTV 537 includes an HDTV control module 538, a display 539, a power supply 540, memory 541, the storage device 542, a network interface 543, and an external interface 545. If the network interface 543 includes a wireless local area network interface, an antenna (not shown) may be included.

The HDTV 537 can receive input signals from the network interface 543 and/or the external interface 545, which can send and receive data via cable, broadband Internet, and/or satellite. The HDTV control module 538 may process the input signals, including encoding, decoding, filtering, and/or formatting, and generate output signals. The output signals may be communicated to one or more of the display 539, memory 541, the storage device 542, the network interface 543, and the external interface 545.

Memory 541 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 542 may include an optical storage drive, such as a DVD drive, and/or a hard disk drive (HDD). The HDTV control module 538 communicates externally via the network interface 543 and/or the external interface 545. The power supply 540 provides power to the components of the HDTV 537.

In FIG. 21B, the teachings of the disclosure may be implemented in a storage device 550 of a vehicle 546. The vehicle 546 may include a vehicle control system 547, a power supply 548, memory 549, the storage device 550, and a network interface 552. If the network interface 552 includes a wireless local area network interface, an antenna (not shown) may be included. The vehicle control system 547 may be a powertrain control system, a body control system, an entertainment control system, an anti-lock braking system (ABS), a navigation system, a telematics system, a lane departure system, an adaptive cruise control system, etc.

The vehicle control system 547 may communicate with one or more sensors 554 and generate one or more output signals 556. The sensors 554 may include temperature sensors, acceleration sensors, pressure sensors, rotational sensors, airflow sensors, etc. The output signals 556 may control engine operating parameters, transmission operating parameters, suspension parameters, etc.

The power supply 548 provides power to the components of the vehicle 546. The vehicle control system 547 may store data in memory 549 and/or the storage device 550. Memory 549 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 550 may include an optical storage drive, such as a DVD drive, and/or a hard disk drive (HDD). The vehicle control system 547 may communicate externally using the network interface 552.

Figure 21D:
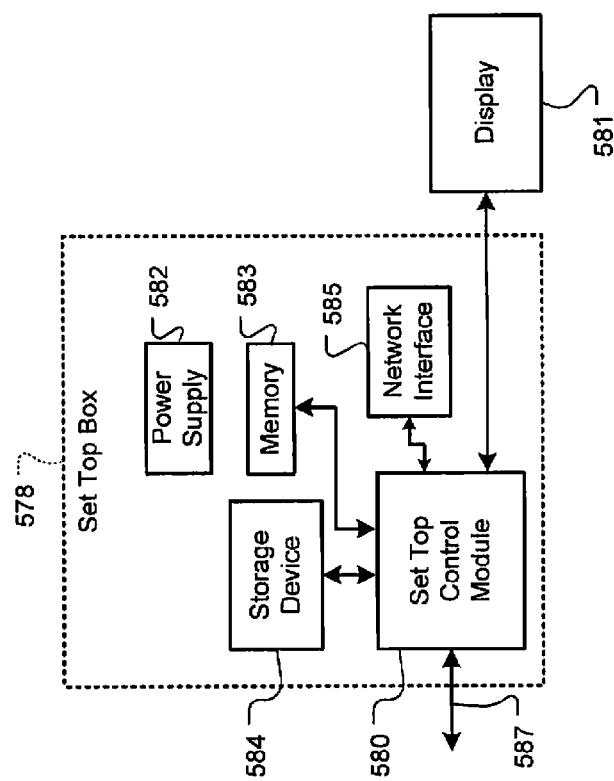
FIG. 21D is a functional block diagram of a set top box.
Figure 21C:
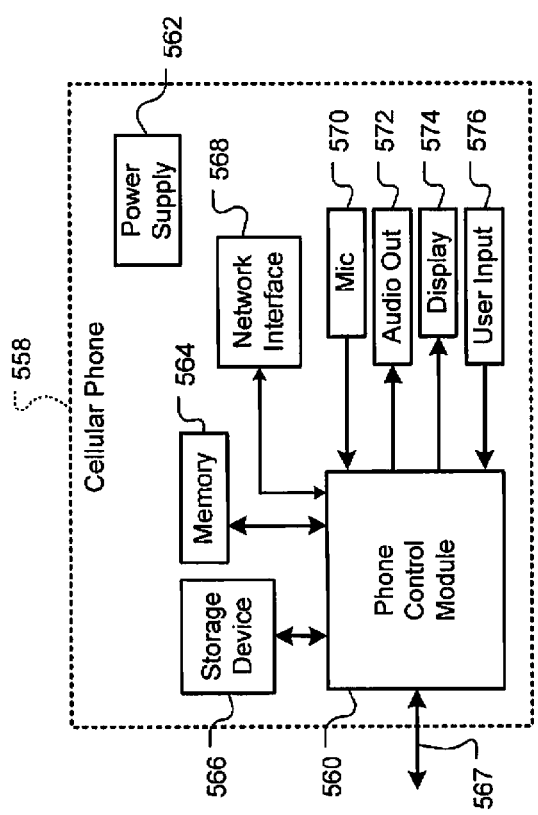
FIG. 21C is a functional block diagram of a cellular phone.

In FIG. 21C, the teachings of the disclosure can be implemented in a storage device 566 of a cellular phone 558. The cellular phone 558 includes a phone control module 560, a power supply 562, memory 564, the storage device 566, and a cellular network interface 567. The cellular phone 558 may include a network interface 568, a microphone 570, an audio output 572 such as a speaker and/or output jack, a display 574, and a user input device 576 such as a keypad and/or pointing device. If the network interface 568 includes a wireless local area network interface, an antenna (not shown) may be included.

The phone control module 560 may receive input signals from the cellular network interface 567, the network interface 568, the microphone 570, and/or the user input device 576. The phone control module 560 may process signals, including encoding, decoding, filtering, and/or formatting, and generate output signals. The output signals may be communicated to one or more of memory 564, the storage device 566, the cellular network interface 567, the network interface 568, and the audio output 572.

Memory 564 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 566 may include an optical storage drive, such as a DVD drive, and/or a hard disk drive (HDD). The power supply 562 provides power to the components of the cellular phone 558.

In FIG. 21D, the teachings of the disclosure can be implemented in a storage device 584 of a set top box 578. The set top box 578 includes a set top control module 580, a display 581, a power supply 582, memory 583, the storage device 584, and a network interface 585. If the network interface 585 includes a wireless local area network interface, an antenna (not shown) may be included.

The set top control module 580 may receive input signals from the network interface 585 and an external interface 587, which can send and receive data via cable, broadband Internet, and/or satellite. The set top control module 580 may process signals, including encoding, decoding, filtering, and/or formatting, and generate output signals. The output signals may include audio and/or video signals in standard and/or high definition formats. The output signals may be communicated to the network interface 585 and/or to the display 581. The display 581 may include a television, a projector, and/or a monitor.

The power supply 582 provides power to the components of the set top box 578. Memory 583 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 584 may include an optical storage drive, such as a DVD drive, and/or a hard disk drive (HDD).

Figure 21E:
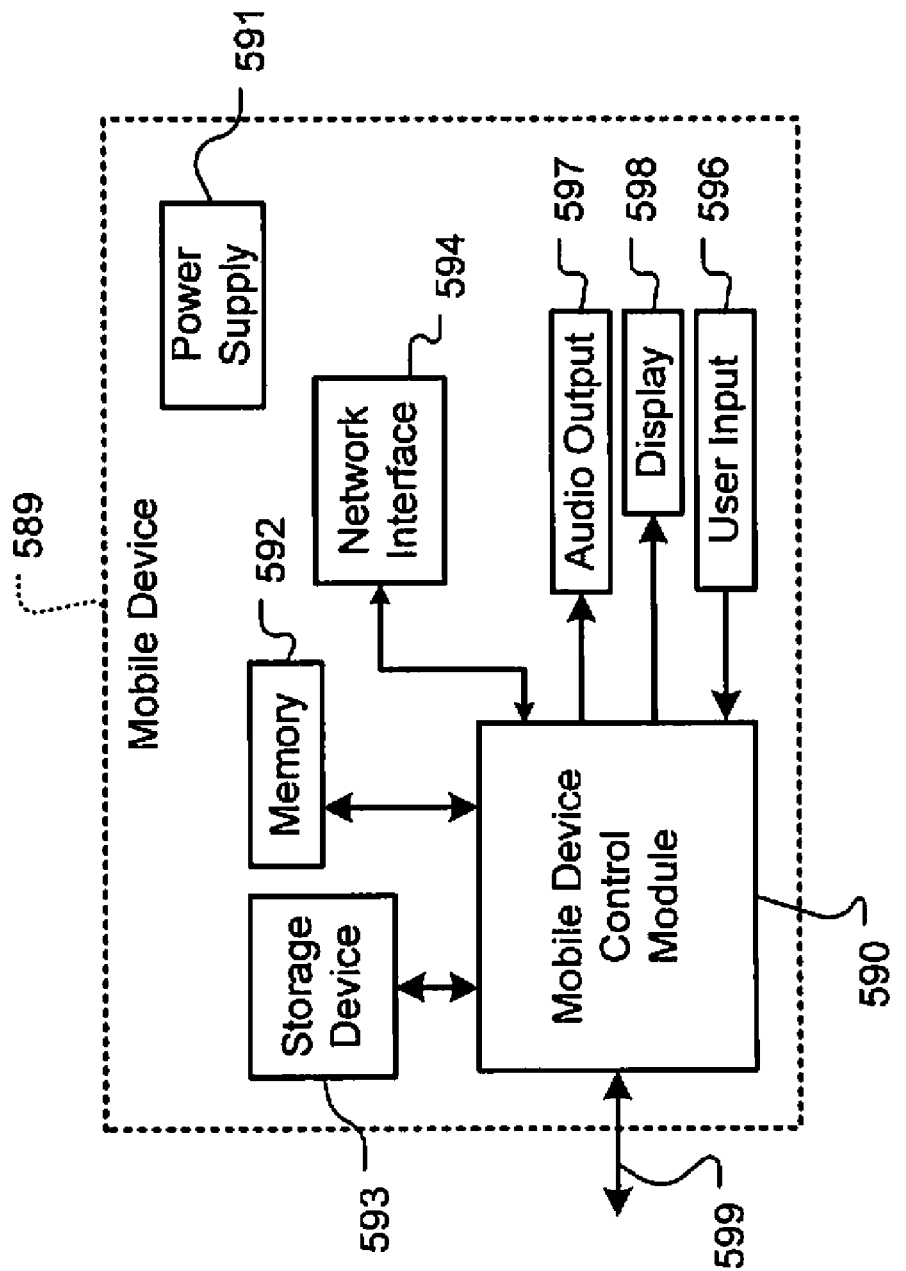
FIG. 21E is a functional block diagram of a mobile device.

In FIG. 21E, the teachings of the disclosure can be implemented in a storage device 593 of a mobile device 589. The mobile device 589 may include a mobile device control module 590, a power supply 591, memory 592, the storage device 593, a network interface 594, and an external interface 599. If the network interface 594 includes a wireless local area network interface, an antenna (not shown) may be included.

The mobile device control module 590 may receive input signals from the network interface 594 and/or the external interface 599. The external interface 599 may include USB, infrared, and/or Ethernet. The input signals may include compressed audio and/or video, and may be compliant with the MP3 format. Additionally, the mobile device control module 590 may receive input from a user input 596 such as a keypad, touchpad, or individual buttons. The mobile device control module 590 may process input signals, including encoding, decoding, filtering, and/or formatting, and generate output signals.

The mobile device control module 590 may output audio signals to an audio output 597 and video signals to a display 598. The audio output 597 may include a speaker and/or an output jack. The display 598 may present a graphical user interface, which may include menus, icons, etc. The power supply 591 provides power to the components of the mobile device 589. Memory 592 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 593 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A self-servo-write system of a hard disk drive, the self-servo-write system comprising:
    a timing control module configured to generate (i) timing information of a first set of servo spirals and (ii) timing control signals for writing a second set of final servo wedges based on the timing information; and
    a position control module configured to generate (i) position information of the first set of servo spirals and (ii) positioning control signals for writing the second set of final servo wedges based on the timing information,
    wherein less than half of the servo spirals in the first set of servo spirals are over-written while writing the second set of final servo wedges, and
    wherein a ratio of a first number of final servo wedges in the second set of final servo wedges to a second number of servo spirals in the first set of servo spirals is a non-integer greater than one.

2. The self-servo-write system of claim 1, wherein said timing control module comprises:
    a demodulation module configured to (i) demodulate spiral servo wedges of the first set of servo spirals and (ii) generate the timing information;
    a phase-locked loop module configured to generate first control signals, wherein the phase-locked loop module is synchronized to the timing information; and
    a synthesizer module configured to synthesize, based on the first control signals, (i) read control signals for controlling reading of the first set of servo spirals and (ii) write control signals for controlling writing of the second set of final servo wedges.

3. The self-servo-write system of claim 2, further comprising:
    a read window module configured to generate a read window to read the first set of servo spirals based on the read control signals; and
    a write window module configured to generate a write window for writing the second set of final servo wedges based on the write control signals,
    wherein the write control signals are synchronized to circumferential positions of the first set of servo spirals.

4. The self-servo-write system of claim 3, further comprising:
    a collision detector module configured to detect when the read window coincides with the write window,
    wherein in response to the read window coinciding with the write window, (i) the timing control module is configured to disregard the timing information, and (ii) the position control module is configured to disregard the position information.

5. The self-servo-write system of claim 3, further comprising:
    a collision detector module configured to (i) detect when the read window coincides with the write window and (ii) generate a collision detect signal in response to the read window coinciding with the write window; and
    an error processing module configured to (i) measure repeatable runout errors and non-repeatable runout errors in the timing information, (ii) generate feed-forward information based on the repeatable runout errors, and (iii) generate feedback information based on the non-repeatable runout errors,
    wherein the position control module is configured to (i) select the feed-forward information or the feedback information based on the collision detect signal and (ii) generate the positioning control signals based on the selected one of the feed-forward information or the feedback information.

6. The self-servo-write system of claim 2, further comprising:
    an error processing module configured to (i) measure repeatable runout errors and non-repeatable runout errors in the timing information, (ii) generate feed-forward information based on the repeatable runout errors, and (iii) generate feedback information based on the non-repeatable runout errors,
    wherein the synthesizer module is configured to generate the read control signals and the write control signals based on at least one of the feed-forward information and the feedback information.

7. The self-servo-write system of claim 2, wherein the phase-locked loop module comprises:
    a read ramp generator module configured to generate a read ramp based on a first number of servo spirals read per revolution of the hard disk drive;
    a write ramp generator module configured to generate a write ramp based on a second number of final servo wedges written per revolution of the hard disk drive;
    a phase detector module configured to detect a difference in a first phase of the read ramp and a second phase of the write ramp; and
    a compensation module configured to compensate the difference,
    wherein write control signals are synchronized to circumferential positions of the first set of servo spirals.

8. The self-servo-write system of claim 1, wherein the position control module further comprises:
    a repeatable runout measuring module configured to measure (i) first repeatable runout errors in response to reading the first set of servo spirals at a first radius during one revolution of the hard disk drive and (ii) second repeatable runout errors in response to reading the first set of servo spirals at a second radius during one revolution of the hard disk drive;

a position measuring module configured to (i) measure first positions of the first set of servo spirals at the first radius, (ii) measure second positions of the first set of servo spirals at the second radius, (iii) generate third positions by subtracting the first repeatable runout errors from corresponding ones of the first positions, (iv) generate fourth positions by subtracting the second repeatable runout errors from corresponding ones of the second positions, and (v) generate midpoints of the third positions and the fourth positions;

an interpolation module configured to (i) interpolate the first repeatable runout errors and the second repeatable runout errors, (ii) generate interpolated repeatable runout errors, (iii) subtract the interpolated repeatable runout errors from the midpoints, and (iv) generate final positions for writing the second set of final servo wedges; and a write positioning module configured to generate the positioning control signals based on the final positions.

9. The self-servo-write system of claim 1, wherein the timing control module further comprises:

a repeatable runout measuring module configured to measure (i) first repeatable runout errors in response to reading the first set of servo spirals at a first radius during one revolution of the hard disk drive and (ii) second repeatable runout errors in response to reading the first set of servo spirals read at a second radius during one revolution of the hard disk drive; and an interpolation module configured to (i) interpolate the first repeatable runout errors and the second repeatable runout errors, (ii) generate interpolated repeatable runout errors, and (iii) generate the timing control signals by subtracting the interpolated repeatable runout errors from the timing information, wherein the timing control signals are independent of the repeatable runout errors.

10. The self-servo-write system of claim 1, further comprising:

a first processor core configured to perform write accounting at a first priority when the second set of final servo wedges are written; and a second processor core configured to process the timing information and the position information at a second priority, wherein the first priority is greater than the second priority.

11. The self-servo-write system of claim 1, further comprising:

a read channel module in communication with the timing control module, wherein the read channel module is configured to (i) read the first set of servo spirals and (ii) write the second set of final servo wedges based on the timing control signals; and a driver module in communication with the position control module, wherein the driver module is configured to position a read/write head of the hard disk drive based on the positioning control signals.

12. A method comprising:

generating timing information of a first set of servo spirals written on a hard disk drive;

generating timing control signals for writing a second set of final servo wedges on the hard disk drive based on the timing information; and generating (i) position information of the first set of servo spirals and (ii) positioning control signals for writing the second set of final servo wedges based on the timing information, wherein less than half of the servo spirals in the first set of servo spirals are over-written while writing the second set of final servo wedges, and wherein a ratio of a first number of final servo wedges in the second set of final servo wedges to a second number of servo spirals in the first set of servo spirals is a non-integer greater than one.

13. The method of claim 12, further comprising:

generating the timing information by demodulating spiral servo wedges of the first set of servo spirals;

synchronizing a phase-locked loop to the timing information;

generating first control signals using the phase-locked loop synchronized to the timing information; and synthesizing, based on the first control signals, (i) read control signals for controlling reading of the first set of servo spirals and (ii) write control signals for controlling writing of the second set of final servo wedges.

14. The method of claim 13, further comprising:

generating a read window to read the first set of servo spirals based on the read control signals; and generating a write window for writing the second set of final servo wedges based on the write control signals, wherein the write control signals are synchronized to circumferential positions of the first set of servo spirals.

15. The method of claim 14, further comprising:

detecting when the read window coincides with the write window;

generating a collision detect signal in response to the read window coinciding with the write window;

measuring repeatable runout errors and non-repeatable runout errors in the timing information;

generating feed-forward information based on the repeatable runout errors;

generating feedback information based on the non-repeatable runout errors;

selecting the feed-forward information or the feedback information based on the collision detect signal; and generating the positioning control signals based on the selected one of the feed-forward information or the feedback information.

16. The method of claim 13, further comprising:

measuring repeatable runout errors and non-repeatable runout errors in the timing information;

generating feed-forward information based on the repeatable runout errors;

generating feedback information based on the non-repeatable runout errors; and generating the read control signals and the write control signals based on at least one of the feed-forward information and the feedback information.

17. The method of claim 13, further comprising:

generating a read ramp based on a first number of servo spirals read per revolution of the hard disk drive;

generating a write ramp based on a second number of final servo wedges written per revolution of the hard disk drive;

detecting a difference in a first phase of the read ramp and a second phase of the write ramp; and compensating the difference, wherein write control signals are synchronized to circumferential positions of the first set of servo spirals.

18. The method of claim 12, further comprising:

measuring first repeatable runout errors in response to reading the first set of servo spirals at a first radius during one revolution of the hard disk drive;

measuring second repeatable runout errors in response to reading the first set of servo spirals at a second radius during one revolution of the hard disk drive;

measuring first positions of the first set of servo spirals at the first radius;

measuring second positions of the first set of servo spirals at the second radius;

generating third positions by subtracting the first repeatable runout errors from corresponding ones of the first positions;

generating fourth positions by subtracting the second repeatable runout errors from corresponding ones of the second positions;

generating midpoints of the third positions and the fourth positions;

interpolating the first repeatable runout errors and the second repeatable runout errors;

generating interpolated repeatable runout errors;

subtracting the interpolated repeatable runout errors from the midpoints;

generating final positions for writing the second set of final servo wedges; and generating the positioning control signals based on the final positions.

19. The method of claim 12, further comprising:

measuring first repeatable runout errors in response to reading the first set of servo spirals at a first radius during one revolution of the hard disk drive;

measuring second repeatable runout errors in response to reading the first set of servo spirals read at a second radius during one revolution of the hard disk drive;

interpolating the first repeatable runout errors and the second repeatable runout errors;

generating interpolated repeatable runout errors; and generating the timing control signals by subtracting the interpolated repeatable runout errors from the timing information, wherein the timing control signals are independent of the repeatable runout errors.

20. The method of claim 12, further comprising:

reading the first set of servo spirals and writing the second set of final servo wedges based on the timing control signals;

positioning a read/write head of the hard disk drive based on the positioning control signals;

performing write accounting using a first processor core at a first priority when the second set of final servo wedges are written; and processing the timing information and the position information using a second processor core at a second priority, wherein the first priority is greater than the second priority.

* * * * *